United States Patent
Ying et al.

(10) Patent No.: US 7,046,622 B2
(45) Date of Patent: *May 16, 2006

(54) MULTI-TIER, HIERARCHICAL FIBER OPTIC CONTROL NETWORK

(75) Inventors: Jeffrey Ying, Glendora, CA (US); Yongchang Wang, Diamond Bar, CA (US)

(73) Assignee: I/O Controls Corporation, Azusa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/122,958

(22) Filed: May 4, 2005

(65) Prior Publication Data

US 2005/0201275 A1    Sep. 15, 2005

Related U.S. Application Data

(63) Continuation of application No. 10/193,731, filed on Jul. 10, 2002, now Pat. No. 6,965,560.

(51) Int. Cl.
*H04L 1/22* (2006.01)
*H04L 12/423* (2006.01)

(52) U.S. Cl. .................... 370/222; 370/405; 370/452

(58) Field of Classification Search ............. 370/219, 370/220, 222, 223, 224, 258, 403, 404, 405, 370/452, 453; 340/3.1
See application file for complete search history.

(56) References Cited

U.S. PATENT DOCUMENTS

| | | | |
|---|---|---|---|
| 3,652,798 A | 3/1972 | McNeilly et al. ............. 179/15 |
| 4,366,565 A | 12/1982 | Herskowitz .................... 370/1 |
| 4,569,060 A | 2/1986 | Esterling et al. ............ 375/278 |
| 4,633,246 A | 12/1986 | Jones et al. ................ 370/224 |
| 4,653,072 A | 3/1987 | Vercellotti et al. .......... 375/340 |
| 4,689,736 A | 8/1987 | Glaudel et al. ................ 700/19 |
| 4,704,713 A | 11/1987 | Haller et al. ................... 370/3 |
| 4,835,763 A | 5/1989 | Lau ............................. 370/16 |
| 5,003,531 A | 3/1991 | Farinholt et al. .......... 370/16.1 |
| 5,012,468 A | 4/1991 | Siegel et al. ............... 370/85.5 |

(Continued)

FOREIGN PATENT DOCUMENTS

JP          10-326259        12/1998

(Continued)

OTHER PUBLICATIONS

Wu, Tsong-Ho, et al., "High-Speed Self-Healing Ring Architectures for Future Interoffice Networks," IEEE, 1989, pp. 801-807.

(Continued)

*Primary Examiner*—Melvin Marcelo
(74) *Attorney, Agent, or Firm*—Irell & Manella LLP

(57) ABSTRACT

A control network comprises multiple master nodes and multiple slave nodes, connected together in a loop configuration by at least one fiber optic cable. The master nodes share concurrent control over the network nodes by time multiplexing or other techniques. The control network may include two fiber optic rings which carry the same data simultaneously in opposite directions around the loop. A polling scheme may be used by the master nodes such that only one node transmits at a given time in both directions around the loop. The receiving node(s) propagate the transmissions and select between the transmissions based on time, error rate, or other factors. A hierarchical control network may be constructed with upper tier and lower tier fiber optic rings. Multiple master nodes may be used at any level of the ring, and some or all of the rings may include two fiber optics for bidirectional, redundant communication within the network.

23 Claims, 22 Drawing Sheets

U.S. PATENT DOCUMENTS

| | | |
|---|---|---|
| 5,107,490 A | 4/1992 | Wilson et al. ............. 370/85.3 |
| 5,218,604 A | 6/1993 | Sosnosky ................ 370/85.14 |
| 5,295,012 A | 3/1994 | Wilson et al. ............. 359/135 |
| 5,396,357 A | 3/1995 | Goossen et al. |
| 5,418,785 A | 5/1995 | Olshansky et al. ........ 370/85.5 |
| 5,442,623 A | 8/1995 | Wu ........................... 370/16.1 |
| 5,457,556 A | 10/1995 | Shiragaki ................... 359/117 |
| 5,465,254 A | 11/1995 | Wilson et al. ................ 370/79 |
| 5,469,282 A | 11/1995 | Ishioka ....................... 359/110 |
| 5,546,403 A | 8/1996 | Yamamoto et al. ........ 371/20.5 |
| 5,600,469 A | 2/1997 | Yamazaki ................... 359/135 |
| 5,647,035 A | 7/1997 | Cadeddu et al. ............. 385/24 |
| 5,896,213 A | 4/1999 | Nagahori et al. ........... 359/137 |
| 5,907,486 A | 5/1999 | Ying ........................... 364/132 |
| 6,023,359 A | 2/2000 | Asahi ......................... 359/119 |
| 6,025,945 A | 2/2000 | Nyu et al. .................. 359/152 |
| 6,034,798 A | 3/2000 | Öberg ........................ 359/119 |
| 6,061,600 A | 5/2000 | Ying .............................. 700/3 |
| 6,094,416 A | 7/2000 | Ying ........................... 370/222 |
| 6,147,967 A | 11/2000 | Ying ........................... 370/222 |
| 6,192,173 B1 | 2/2001 | Solheim et al. ............... 385/24 |
| 6,201,995 B1 | 3/2001 | Ying |
| 6,233,074 B1 | 5/2001 | Lahat et al. ................. 359/118 |
| 6,243,512 B1 | 6/2001 | Rettenberger et al. ........ 385/24 |
| 6,327,400 B1 | 12/2001 | Harstead et al. .............. 385/22 |
| 6,611,860 B1 | 8/2003 | Ying |
| 6,820,158 B1 * | 11/2004 | Lee et al. ................... 710/305 |
| 2003/0140109 A1 * | 7/2003 | Pospesel et al. ............ 709/208 |
| 2003/0165119 A1 * | 9/2003 | Hsu et al. ................... 370/258 |

FOREIGN PATENT DOCUMENTS

| | | |
|---|---|---|
| JP | 10-333930 | 12/1998 |

OTHER PUBLICATIONS

Drake, J. Vernon, "A Review of the Four Major SONET/SDH Rings," Communications, 1993, ICC 93, Geneva, Technical Program, Conference Record, IEEE International Conference, May 1993, vol. 2, pp. 878-884.

* cited by examiner

MULTI-TIER, HIERARCHICAL FIBER OPTIC CONTROL NETWORK

RELATED APPLICATION INFORMATION

This application is a continuation of U.S. application Ser. No. 10/193,731, filed on Jul. 10, 2002 now U.S. Pat. No. 6,965,560. This application is also related to U.S. application Ser. Nos. 10/193,714 and 10/193,717, both of which are filed Jul. 10, 2002. All of the foregoing applications are hereby incorporated by reference as if set forth fully herein.

BACKGROUND OF THE INVENTION

1) Field of the Invention

The field of the present invention generally relates to control networks and related methods for configuring and operating control networks.

2) Background

Automated control systems are commonly used in a number of manufacturing, transportation, and other applications, and are particularly useful for controlling machinery, sensors, electronics, and other system components. For example, manufacturing or vehicular systems may be outfitted with a variety of sensors and automated electrical and/or mechanical parts that require enablement or activation when needed to perform their assigned functions. Such systems commonly require that functions or procedures be carried out in a prescribed order or with a level of responsiveness that precludes sole reliance on manual control. Also, such systems may employ sensors or other components that require continuous or periodic monitoring and therefore lend themselves to automated control.

As the tasks performed by machinery and electronics have grown in number and complexity, a need has arisen for ways to exercise control over the various components of a system rapidly, efficiently and reliably. The sheer number of system components to be monitored, enabled, disabled, activated, deactivated, adjusted, or otherwise controlled can lead to challenges in designing and implementing sophisticated control systems. As the number of controlled components in a system increases, not only do control functions become more complicated, but also the wiring or inter-connections of the control system become more elaborate and complex. A robust, scalable control system is therefore needed.

In addition, increasing reliance on automated control in various fields has resulted in more significant potential consequences if the automated control system fails. Therefore, a need exists for a reliable control system that is nevertheless capable of controlling large systems if necessary.

Traditionally, control systems in certain applications, such as transit vehicles and railcars, have relied upon relay-based control technology. In such systems, relays and switches are slaved to a logic circuit that serves to switch signal connections. This approach requires a large number of relays and a substantial amount of wiring throughout the vehicle. In some instances distributed processors or logic circuits may be used for subsystems such as the door, but these processors or logic circuits often take up significant space and can be costly to maintain.

Substantial improvements in the field of automated control in general, and vehicular control in particular. Various such improvements are described, for example, in U.S. Pat. Nos. 5,907,486, 6,061,600, 6,094,416, 6,147,967, and 6,201,995, all of which are assigned to the assignee of the present invention, and all of which are hereby incorporated by reference as if set forth fully herein.

In recent years, increasing attention has been given to fiber optic networks. Many fiber optic networks are used solely or primarily to transport data. Some fiber optic networks have a ring architecture, wherein data is transmitted from an originating node to a destination node by passing through each intervening node in the ring. To provide some measure of redundancy and increased reliability, in the case of, e.g., a fiber optic break in the ring, a two fiber ring network has been developed, with one ring designated as the working ring (or service ring) and the other ring designated as the protection ring. Data is ordinarily transported over the working ring. However, if a break or other failure occurs in the working ring, data is looped back on the protection ring at the nodes adjacent to the failure, thereby effectively forming a new loop.

In order to increase throughput and/or reliability even further, some network architectures have been proposed with four fiber rings, two of which are working rings and two of which are protection rings. Also, various schemes have been proposed for selecting different wavelengths on the fibers to achieve higher data throughput or increased flexibility.

While the variety of fiber optic networks continues to proliferate, relatively little advancement has been made in applying fiber optic networks to control system applications. Few, if any, fiber optic network architectures and protocols provide an optimal combination of reliability, simplicity, versatility, scalability, and robustness suitable for control system applications.

Accordingly, it would be advantageous to provide a fiber optic control system, architecture, and method that overcomes one or more of the foregoing problems, disadvantages, or drawbacks.

SUMMARY OF THE INVENTION

The invention in one aspect is generally directed to control networks and to methods for configuring and operating networks for control and other applications.

In one aspect, a control network comprises a plurality of network nodes, including multiple master nodes and multiple slave nodes, connected together in a loop configuration by at least one fiber optic cable. The master nodes preferably share concurrent control over the network nodes, by, for example, communicating with network nodes in designated time slots and/or using designated light wavelengths.

In another separate aspect, a method for configuring and operating a network comprises the steps of connecting a plurality of network nodes in a loop configuration using at least one fiber optic ring; configuring a first plurality of the network nodes as master nodes; configuring a second plurality of the network nodes as slave nodes; and sharing concurrent control by the master nodes over the network nodes.

In yet another separate aspect, a control network comprises a plurality of network nodes connected in a loop configuration by at least two fiber optic rings which carry data in opposite directions around the loop. The network nodes preferably communicate according to a protocol wherein one network node transmits data at a given time. Each of the network nodes, when communicating with other nodes, concurrently transmits identical data, in opposite directions, over two fiber optic rings. Each non-transmitting network node receives the data transmitted by the transmitting network node over both of the fiber optic rings and selects for further processing the earliest arriving data from the two fiber optic rings. In certain embodiments, fault conditions (e.g., a broken or damaged fiber segment) may be detected according to a test protocol wherein the various nodes in the loops are polled sequentially.

In yet another separate aspect, a multi-master network control network includes a plurality of network nodes, at least two of which are master nodes, connected in a loop configuration by at least two fiber optic rings which carry data in opposite directions around the loop. The network nodes preferably communicate according to a protocol wherein one network node transmits data at a given time. Each of the network nodes, when communicating with other nodes, concurrently transmits identical data, in opposite directions, over two fiber optic rings. Each non-transmitting network node receives the data transmitted by the transmitting network node over both of the fiber optic rings and selects for further processing the earliest arriving data from the two fiber optic rings.

Further embodiments, variations and enhancements are also disclosed herein.

BRIEF DESCRIPTION OF THE DRAWINGS

FIG. 15A is a more detailed diagram of one embodiment of a receive arbiter circuit, while

DETAILED DESCRIPTION OF PREFERRED EMBODIMENTS

Figure 1:
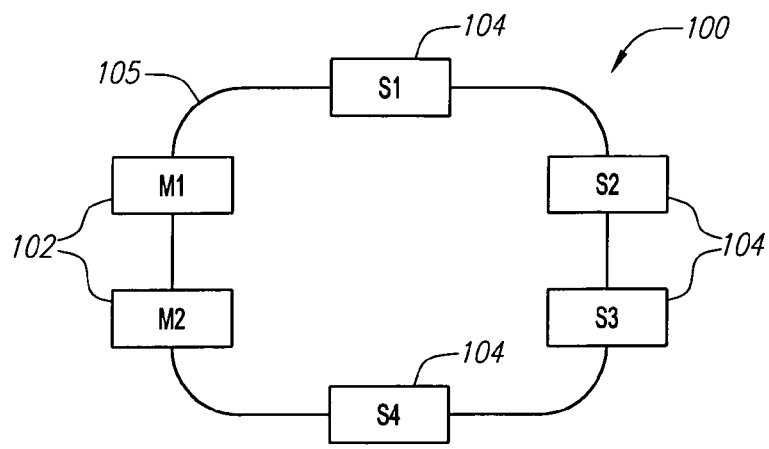
FIG. 1 is a top-level diagram of a master-slave fiber optic control ring network with two master nodes.

FIG. 1 is a top-level diagram of a master-slave fiber optic ring network 100 according to one embodiment as disclosed herein. In the example shown in FIG. 1, the ring network 100 comprises an optical fiber 105 which connects various nodes 102, 104 in a ring architecture. The optical fiber 105 carries data around the network 100 to the various nodes 102, 104. Each node 102, 104 of the ring network 100 can transmit a modulated optical signal a wavelength (or more than one wavelength) that can be detected by downstream nodes. Data is transmitted from an originating node to a destination node by passing through each intervening node on the optical fiber 105. The nodes 102, 104 may support either unidirectional or bidirectional communication on the optical fiber 105.

The nodes 102, 104 connected by the optical fiber 105 generally include both master nodes 102 and slave nodes 104. A feature of the ring network 100 of FIG. 1 is that the network comprises multiple master nodes 102—in this example, two master nodes 102 (designated M1 and M2). The ring network 100 also comprises a number of slave nodes 104 (designated S1, S2, S3, and S4). The two master nodes 102 share concurrent control over the slave nodes 104.

In a preferred embodiment, each master node 102 controls a designated subset of the slave nodes 104. For example, master node M1 may control slave nodes S1 and S2, while master node M2 may control slave nodes S3 and S4. The master nodes 102 may communicate with the slave nodes 104 according to any suitable protocol or technique. In a preferred embodiment, the master nodes 102 use a polling scheme to communicate with individual slave nodes 104 in sequence, during ordinary operation. The master nodes 102 may also, from time to time, issue broadcast messages intended for multiple nodes 102 and/or 104.

Figure 2:
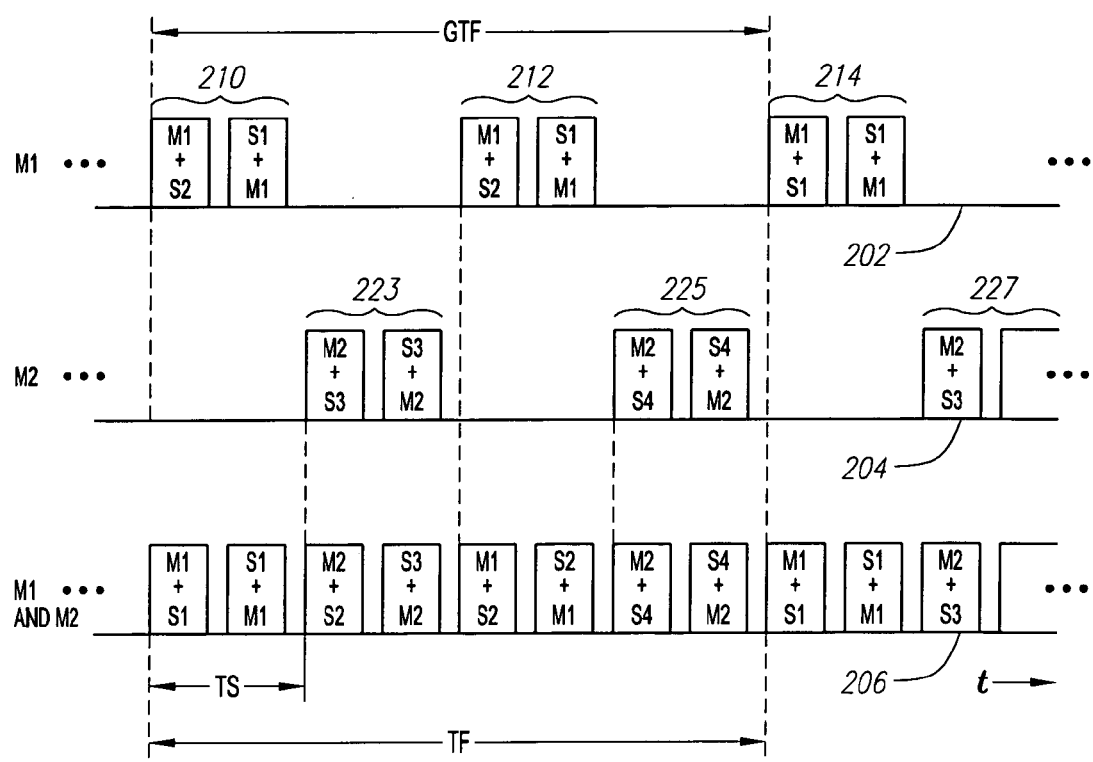
FIG. 2 is a timing diagram illustrating a particular protocol for sharing a transmission loop of a control network among two master nodes.

The master nodes 102 may share communication over the optical fiber 105 through a time division multiplexing technique. An example of a timing protocol by which the two master nodes 102 share communication over the optical fiber 104 is illustrated in FIG. 2, assuming again that the first master node M1 controls slave nodes S1 and S2, and the second master node M2 controls slave nodes S3 and S4. In FIG. 2, a first graph 202 illustrates communications relating to the first master node M1, a second graph 204 illustrates communications relating to the second master node M2, and a third graph 206 illustrates the combined communications shown in the first graph 202 and second graph 204. As indicated in the first graph 202, according to a polling communication scheme, the first master node M1 sends a master-to-slave transmission ("M1→S1") to the first slave node S1 over the optical fiber 105, and receives a slave-to-master transmission ("S1→M1") in return from the first slave node S1. The two transmissions collectively comprise a master-slave command-response message pair 210. The first master node M1 then processes the information received from the first slave node S1, before sending a second master-to-slave transmission ("M1→S2") to the second slave node S2 over the optical fiber 105, and receiving a second slave-to-master transmission ("S1→M1") in return from the first slave node S1. These two transmissions collectively comprise a second master-slave command-response message pair 212.

After the first master node M1 processes the information received from the second slave node S2, the first master node M1 would then ordinarily exchange communications in a designated sequence with the other slave nodes 104 under its control. In the example of FIG. 1, however, the first master node M1 controls only two slave nodes, so it again exchanges information with the first slave node S1 in another master-slave command-response message pair 214, then again with the second slave node S2, and so on in a repeating pattern.

During the time that the first master node M1 is processing information, the optical fiber 105 is not being used for communication by the first master node M1. Therefore, the second master node M2 may, if desired, make use of the optical fiber 105 to conduct similar polling communications. Thus, as indicated in the second graph 204, the second master node M2 sends a master-to-slave transmission ("M2→S3") to the third slave node S3 over the optical fiber 105, and receives a slave-to-master transmission ("S3→M2") in return from the third slave node S3. The two transmissions collectively comprise a master-slave command-response message pair 223. The second master node M2 then processes the information received from the third slave node S3, before sending a second master-to-slave transmission ("M2→S4") to the fourth slave node S4 over the optical fiber 105, and receiving a second slave-to-master transmission ("S4→M2") in return from the fourth slave node S4. These two transmissions collectively comprise a second master-slave command-response message pair 225.

After the second master node M2 processes the information received from the fourth slave node S4, the second master node M2 would then ordinarily exchange communications in a designated sequence with the other slave nodes 104 under its control. In the example of FIG. 1, however, the second master node M2 controls only two slave nodes, so it then returns to exchanging information with the third slave node S3 in another master-slave command-response message pair 227, then again with the fourth slave node S4, and so on in a repeating pattern, similar to that carried out by the first master node M1.

Figure 4A:
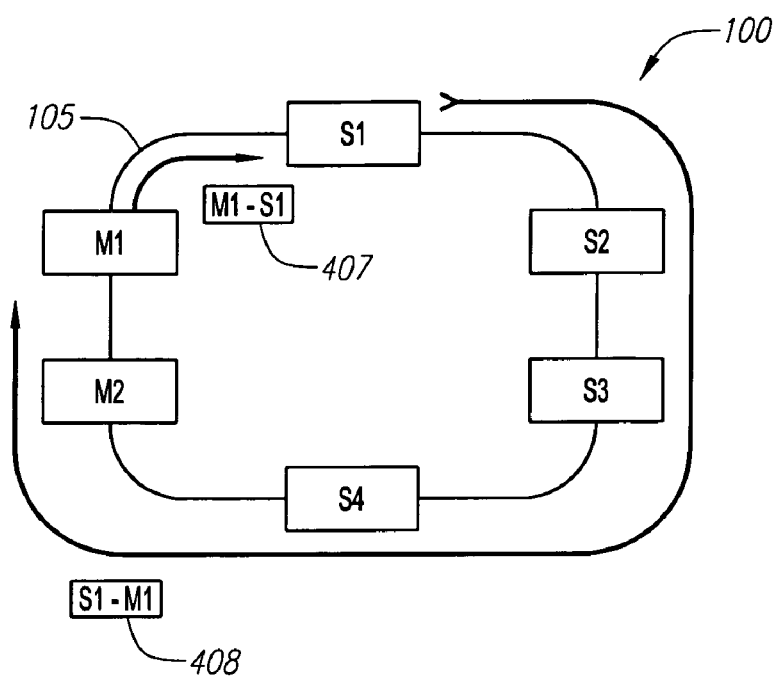
FIGS. 4A and 4B are diagrams illustrating an example of communications in a ring network such as, for example, that shown in FIG. 1.
Figure 4B:
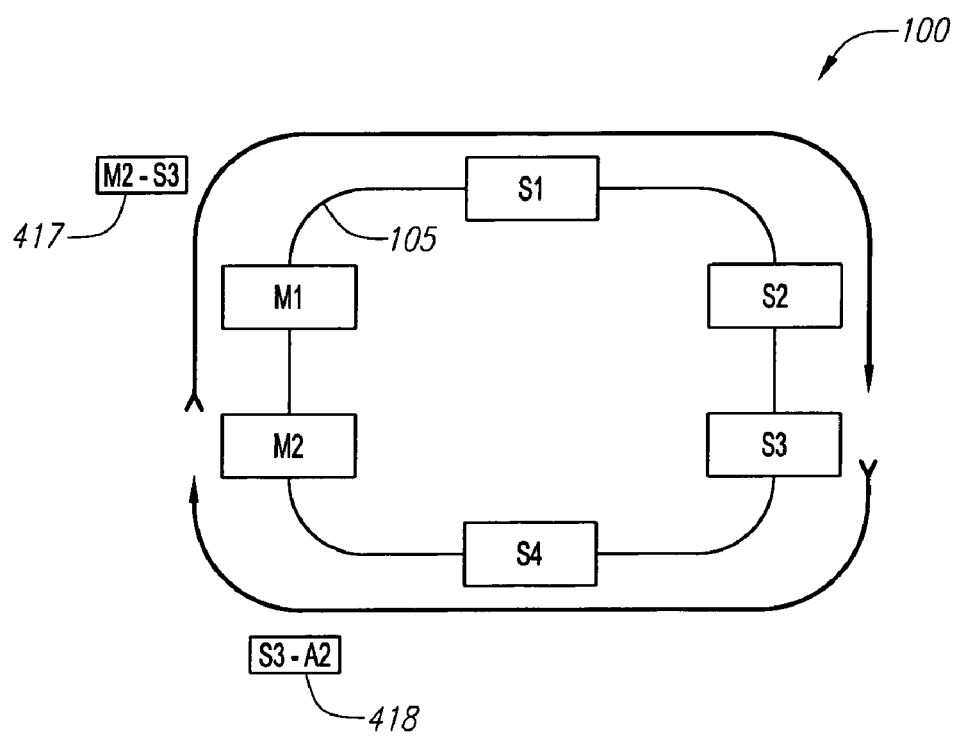

The third graph 206 in FIG. 2 illustrates the combined communications from the two master nodes M1, M2 to the various slave nodes S1, S2, S3, and S4, based upon the communication patterns depicted in the first two graphs 202, 204 of FIG. 2. As illustrated in the third graph 206, the communications by the first master node M1 and second master node M2 are interleaved, with a master-slave command-response message pair of the first master node M1 being followed by a master-slave command-response message pair of the second master node M2, followed again by a master-slave command-response message pair of the first master node, and so on, in a repeating pattern. FIGS. 4A and 4B illustrate diagrammatically the communications along the optical fiber 105 first between the first master node M1 and the first slave node S1, and then the second master node M2 and the third slave node S3. Alternatively, other interleaved (or non-interleaved) protocols may be used. For example, each master node 102 may sequentially transmit a master-to-slave message, and the slave nodes 104 then transmit sequentially in response. However, the protocol set forth in FIG. 2 has the advantage that each slave node 104 can immediately respond to the requesting master node 102 without needing to determine at a later point when to transmit or to confirm that the optical fiber 105 is available for communication.

The master nodes 102 may determine when to transmit their respective master-to-slave messages by, for example, either monitoring communications on the optical fiber 105 and waiting until the preceding slave-to-master transmission is complete, or else by transmitting according to a specified time slot assigned to the particular master node 102. The latter approach has the advantage that the master nodes 102 need not monitor preceding communications nor wait for slave transmissions, which might delay the master node's urgent or necessary communications with its own slave nodes 104. Similarly, the slave nodes 104 may determine when to transmit their slave-to-master response messages by, for example, either waiting until the master-to-slave message has been completed (either immediately or after a predetermined waiting period) or else waiting for a specific time slot following the master-to-slave message.

The size of the transmissions or communication bursts (e.g., M1→S1, S1→M1, etc.) can be chosen based upon any of a number of factors. In one embodiment, for example, the size of each transmission or communication burst is in the range of approximately 10 to 20 bytes. However, the size of the transmission or communication bursts can be shorter or much longer.

In the protocol illustrated in FIG. 2, the communications among the two master nodes M1, M2 and the four slave nodes S1, . . . , S4 may be grouped according to a repeating greater time frame GTF which comprises, e.g., one polling message pair for each slave node 104 being controlled (of course, the protocol may be modified to give additional bandwidth to any particular slave node(s) 104 so requiring). The greater time frame GTF may, in one aspect, be viewed as comprised of four time portions or time slots (TS), each of which comprises a master-slave command-response message pair. Since four slave nodes 104 are being controlled in the example of FIG. 1, there would be four time slots in the greater time frame GTF of FIG. 2.

According to another aspect of the communication protocol of FIG. 2, since the master nodes 102 preferably alternate or rotate communications, each complete rotation of all master nodes 102 making a communication with a slave node 102 may be viewed as collectively comprising a time frame (TF). Thus, each set of two master-slave command-response message pairs, one from the first master node M1 and another from the second master node M2, may be grouped together within a single time frame TF as illustrated in FIG. 2. In this example, there are two time frames TF in the greater time frame GTF, because each master node 102 controls two slave nodes 104. If the master nodes 102 each controlled three slave nodes 104, there would be three time frames 104 in each greater time frame GTF. The time slots TS, time frames TF, and greater time frames GTF need not be uniform in duration, but rather can vary depending upon how long each master-slave command-response message pair (e.g., 210, 212, 223, 225, etc.) to be completed. Alternatively, the time slots TS, time frames TF, and greater time frames GTF may each be of a pre-designated, uniform duration, thus providing a framework for synchronous communication within the network. Transmissions by one or both of the master nodes M1 and M2 can be used by the various network nodes to synchronize communications within the ring network 100.

In an alternative embodiment, the second master node M2 does not ordinarily communicate with the slave nodes, but rather functions primarily as a backup master node for the first master node M1. In such an embodiment, the first master node M1 normally controls all of the slave nodes S1, S2, S3, and S4. If the first master node M1 should fail, the second master node M2 may take over its functionality. A variety of different failure detection techniques, including the failure detection techniques described hereinafter or variations thereof, can be used by the backup master node M2 to detect when the first master node M1 has failed.

The combination(s) of network architecture and communication protocol described above may permit a control network to be constructing using low-cost simple nodes, wherein processing speeds need not be as fast as data transport speeds. While one master node (e.g., M1) is processing information, for example, another master node (e.g., M2) may utilize the optical fiber 105 for communication. The resulting interleaved communications may permit efficient use of the optical fiber 105 as a communication medium, while allowing the master nodes 102 to be relatively inexpensive and simple in construction.

As an alternative to the communication technique illustrated in FIG. 2, the master nodes 102 may share the optical fiber 104 through a different sharing/multiplexing technique, such as, for example, transmitting with different transmission wavelengths for the different master nodes M1, M2 and/or slave nodes, thus allowing concurrent transmissions without interference, and/or uniquely encoding the transmissions from each of the master nodes M1, M2 and/or slave nodes using spread spectrum techniques (thereby utilizing a form of code division multiplexing).

Figure 3:
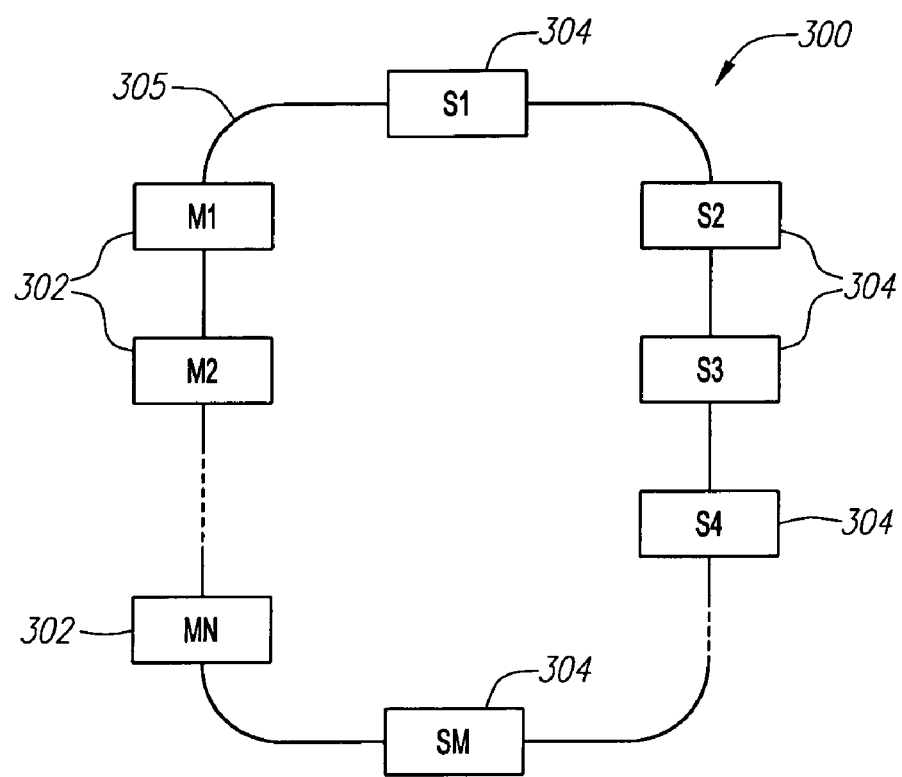
FIG. 3 is a top-level diagram of a master-slave fiber optic ring network with multiple master nodes.

The principles illustrated in the examples of FIGS. 1 and 2 may be extended to ring networks or larger or smaller size, and having additional master nodes. An example of a more generalized ring network is illustrated in FIG. 3. As shown therein, the ring network 300 includes N master nodes 302 designated M1, M2, . . . , MN, and M slave nodes 304, designated S1, S2, . . . , SN, which communicate over the optical fiber 305. The master nodes 302 preferably share concurrent control collectively over the slave nodes 304. In one embodiment, each of the master nodes 302 controls a designated subset (one or more) of the slave nodes 304. The master nodes 302 may communicate according to a protocol such as illustrated in FIG. 2. In such a case, the master nodes 302 may rotate communication with one another, such that each master node 302 transmits to one slave node 304 in a given time frame TF. Alternatively, master nodes 302 responsible for more slave nodes 304 than other master nodes 302 may be given more time slots or time portions within a time frame TF.

Figure 5:
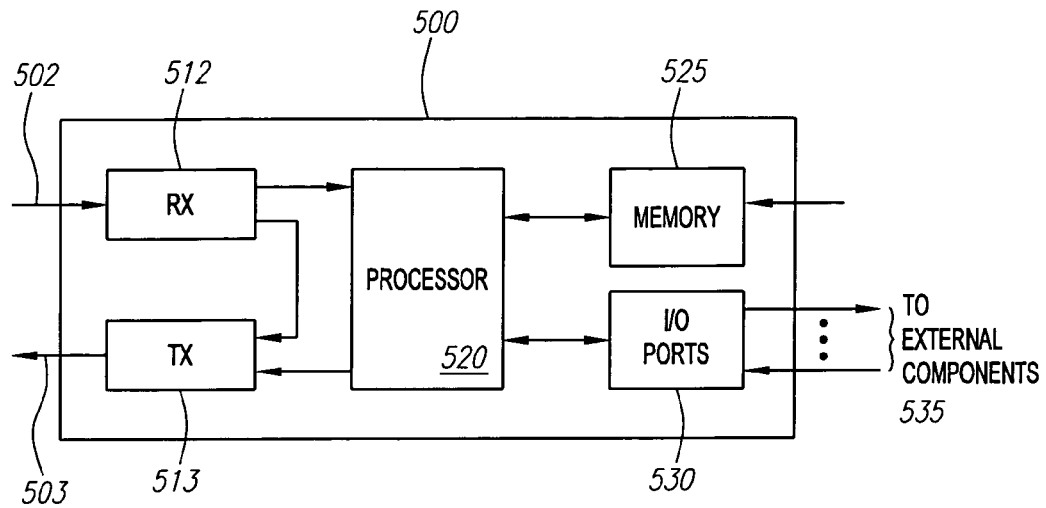
FIG. 5 is a block diagram of a network node according to one embodiment as disclosed herein.

FIG. 5 is a block diagram of a network node 500 according to one embodiment as disclosed herein, as may be utilized, for example, in the ring network of FIG. 1 or FIG. 3 (as either a master node 102 or a slave node 104). In FIG. 5, the network node 500 comprises an optical receiver 512 connected to one branch 502 of an optical fiber of the ring network, and an optical transmitter 513 connected to another branch 503 of the optical fiber of the ring network. The optical receiver 512 and optical transmitter 513 are shown connected to a processor 520, which may comprise, e.g., a microprocessor or microcontroller having suitable processing speed and data throughput to handle the functions to be carried out by the network node 500. The processor 520 is shown connected to a memory 525, which preferably comprises a non-volatile portion (such as, e.g., ROM, PROM, EPROM, EEPROM, or flash ROM) and a volatile portion (e.g., RAM). The non-volatile portion of the memory 525 may store programming instructions which are executed by the processor 520 and thereby control the general operation of the network node 500. The processor 520 may also be connected to a plurality of I/O ports 530, allowing the network node 500 to interface with one or more external components. Examples of such external components include sensors, lights, switches, actuators, and so on.

In operation, the network node 500 receives data from the fiber branch 502 attached to the optical receiver 512, processes the data using processor 520 and/or stores the data, or other data generated in response thereto, in the volatile portion of the memory 525, and, if the protocol calls for it, transmits data via the optical transmitter 513 onto the fiber branch 503.

In one or more embodiments, the network node 500 directly passes through data from the optical receiver 512 to the optical transmitter 513, optionally with some level of processing. In a preferred implementation, the optical receiver 512 converts optical data to electrical data, processes the electrical data, and passes the processed electrical data to the optical transmitter 513, whereupon it is re-converted to optical data and transmitted over a fiber or other optical connection. When the data is in electrical form, it can be examined to determine, for example, whether the communication is intended for the particular node 500, whether errors are present, and so on. In one example, if the network node 500 receives a communication via optical receiver 512 having errors associated with it, the network node 500 adds an error code to the communication as it passes it along, via the optical transmitter 513, for the next node. An error code may indicate, for example, that the communication received from the upstream node was not in an expected format, failed a cyclic redundancy check (CRC) or other error check, failed to contain an expected field or item of information, arrived at an unexpected time, or any other status condition. A master node or other downstream node in the control network may then use the error information to determine problems with the control network.

To facilitate reporting of status conditions using error codes, the control network in which the network node 500 is utilized may employ a communication protocol in which messages exchanged among the various nodes have a pre-designated format which provides for the inclusion of an error code. The error code may, for example, be inserted in a designated location in the message, or else may be appended to the message. If desired, multiple error codes may be added to a message from multiple network nodes in the control network. The network node 500 may be configured to add a new error code to a received message only if it detects an error different in nature from the error(s), if any, indicated by any existing error code(s) already included with the received message (as may have been added by a network node upstream in the control network, for example).

In certain alternative configurations of network node 500, the network node 500 may utilize an add/drop multiplexer in place of the optical receiver 512 and optical transmitter 513. A variety of add/drop multiplexer designs are known in the art of optical communication, and a detailed description thereof is not deemed necessary.

As another alternative, the optical receiver 512 and optical transmitter 513 may each be replaced with an optical transceiver, thereby providing the network node 500 with bidirectional communication capability and, therefore, the ability to support bidirectional communication in the fiber optic ring network.

Figure 6:
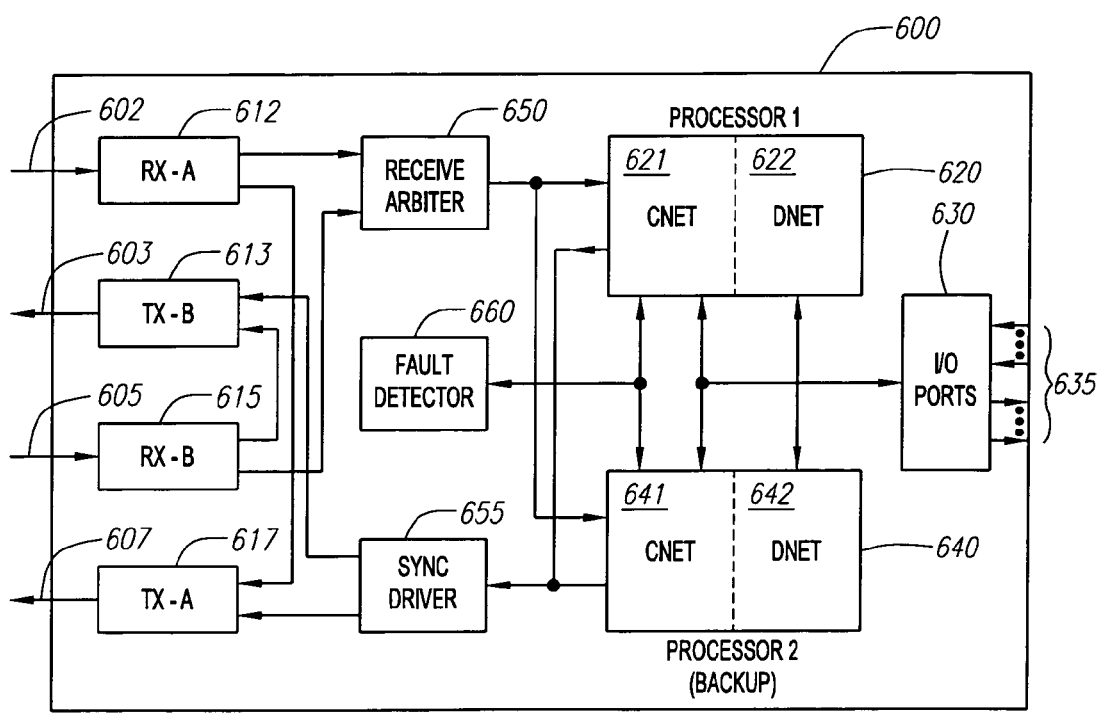
FIG. 6 is a block diagram of a network node according to another embodiment as disclosed herein, adapted for use in a two fiber ring network.

FIG. 6 is a block diagram of a network node 600 according to another embodiment as disclosed herein, adapted for use in a two fiber ring network (such as shown conceptually in, e.g., FIG. 8A, described in greater detail hereinafter). In FIG. 6, the network node 600 includes two optical receivers 612, 615 and two optical transmitters 613, 617. The first optical receiver 612 and optical transmitter 617 are associated with the first fiber optic loop (designated the "A loop"), while the second optical receiver 615 and optical transmitter 613 are associated with the second fiber optic loop (designated the "B loop"). The first optical receiver 612 has an output connected to the first optical transmitter 617, to permit propagation of signals around the A loop. The second optical receiver 615 has an output connected to the second optical transmitter 613, likewise to permit propagation of signals around the B loop. Both optical receivers 612, 615 have outputs connected to a receive arbiter 650, which, as will be explained, selects between data from optical receivers 612, 615 for further processing. Both optical transmitters 613, 617 are preferably driven by a synchronizing driver 655. In the particular example illustrated in FIG. 6, the network node 600 comprises two processors 620, 640, one of which (processor 620 in this example) serves as the primary processor, and the other of which (processor 640 in this example) serves as a backup processor in case the primary processor fails. A fault detector 660 may be communicatively connected to both the processors 620, 640, allowing detection of faults by any of the means as described elsewhere herein. The fault detector 660 is depicted in a conceptual manner and may represent actual hardware or else may simply represent functionality that is built in to the node's software instructions, or any combination thereof. For example, the fault detector may comprise, e.g., a watchdog timer, a software verification routine for periodically testing the integrity of the network ring, or any other hardware or software that can be used to detector a fault condition. Both processors 620, 640 are also preferably communicatively connected to a plurality of I/O ports 630, allowing the processors 620, 640 to communicate with external components over various input/output signal lines 635.

In certain embodiments, as explained later herein, the network node 600 optionally may provide communication capability on a second ring of network nodes. The network node 600 may have the capability of acting both as a slave and a master—a slave with respect to a first ring of network nodes, and a master with respect to a second ring of network nodes. Both the first ring and the second ring may comprise a pair of fiber optic cables for bidirectional communication in each ring. In such an embodiment, both processors 620, 640 of the network node 600 may each comprise two processing units, labeled as "CNET" and "DNET" in the instant example, and the network node 600 may further include a second set of transmit/receive optical components for communicating on the second ring (as illustrated in, e.g., FIG. 19). The CNET processing unit 621 (or 641), acting in a slave capacity, receives and responds to communications from a first network ring, while the DNET processing unit 622 (or 642), acting in a master capacity, transmits commands and receives feedback from slave nodes in the second network ring. As explained hereinafter, such a capability in the network node 600 is particularly well suited for a hierarchical master-slave control network.

In operation, the network node 600 is capable of receiving data on both loops A and B, and transmitting data simultaneously over both loops A and B. Because of differences in propagation delay times depending upon where the network node 600 is situated in the ring network, the receive arbiter 650 performs the task of determining which data (the A loop data or B loop data) should be utilized for further processing. According to a preferred embodiment, the receive arbiter 650 does this by determining which loop data arrived first in time. The first arriving data is processed, while the second arriving data may be used to confirm the accuracy of the first arriving data, or else may be discarded.

Operation of a preferred receive arbiter, as may be used for example in the network node 600 illustrated in FIG. 6, may be described with reference to the examples illustrated in FIGS. 14, 15A, and 16. As shown first in the example of FIG. 14, a receive arbiter 1400 comprises an arbiter circuit 1450 which receives input lines 1402 (associated with a first fiber optic loop or "A-loop") and 1403 (associated with a second fiber optic loop or "B-loop"). Input lines 1402 and 1403 carry data, after appropriate optical-to-electrical conversion, received over the A-loop and B-loop, respectively. Both of input lines 1402, 1403 are also input to a selector 1451. The arbiter circuit 1450 has an output provided to a select input 1460 of the selector 1451. The arbiter 1400 is preferably configured to select between incoming input signals on input lines 1402, 1403 that are expected to contain the same data but potentially be offset from one another by a small amount of time, due to different propagation delays on the two fiber optic rings (the A-loop and the B-loop). The arbiter circuit 1450 examines the incoming signals on the A-loop input line 1402 and on the B-loop input line 1403, and decides, based on one or more criteria (such as earliest arrival time and/or fewest errors), which signal to pass through for further processing. The arbiter circuit 1450 selects the appropriate setting of the select input 1460, which causes the selector 1451 to pass through the appropriate input signal data on for further processing on output line 1452. If necessary, the selector 1451 may temporarily store the input data while the arbiter circuit 1450 is reaching a determination as to which data to pass through.

Figure 14:
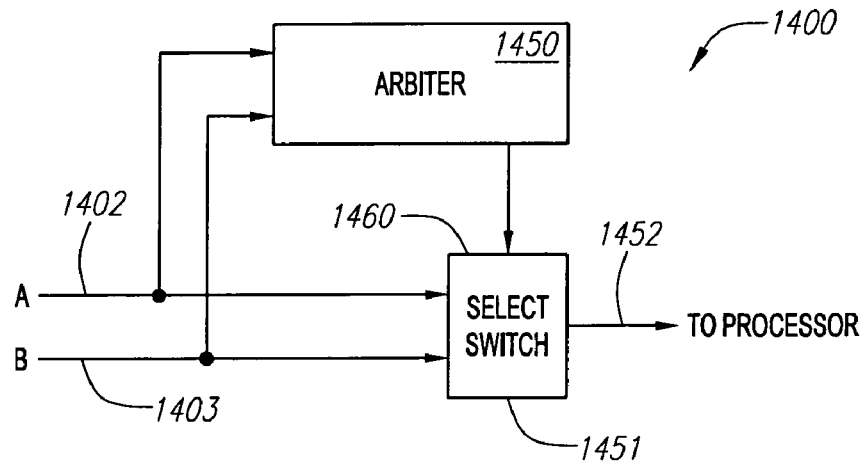
FIG. 14 is a block diagram of a receive arbiter and associated components for a node as may be used in a two fiber network.
Figure 15A:
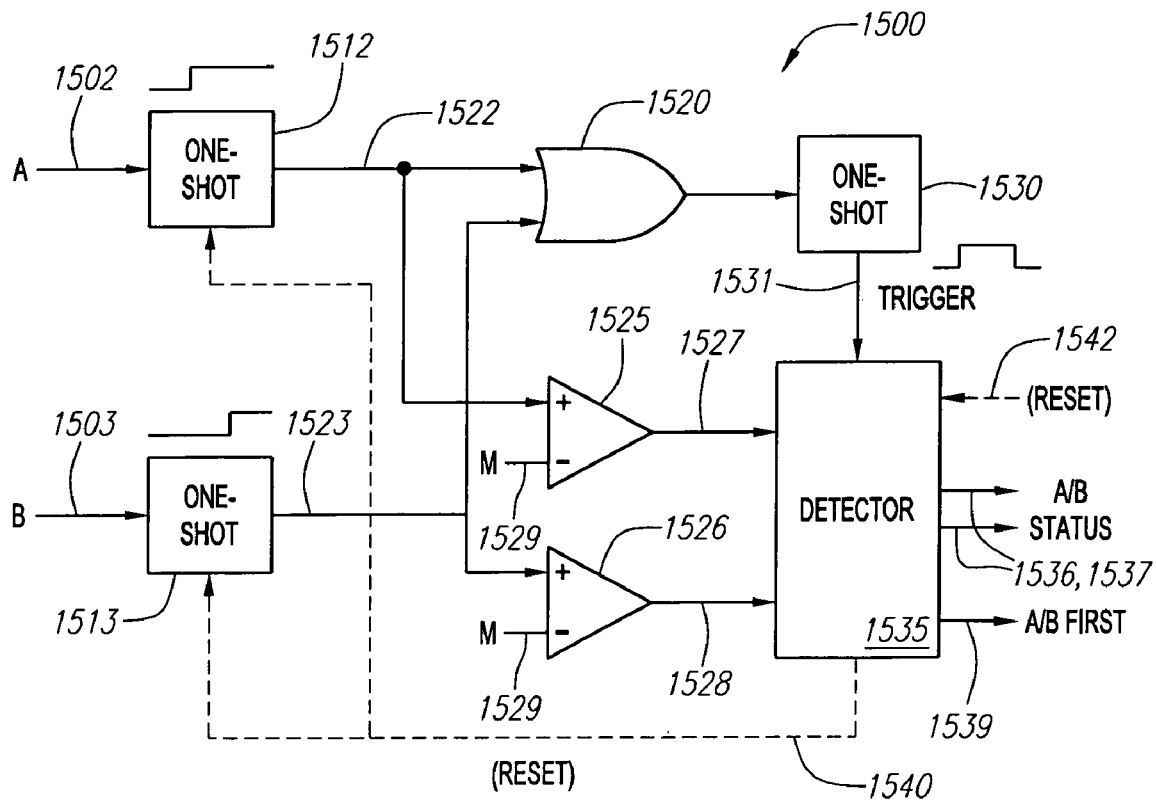

FIG. 15A illustrates a more detailed embodiment of an arbiter circuit 1500 as may be used, for example, in the receive arbiter 1400 illustrated in FIG. 14. In the FIG. 15A embodiment, the receive arbiter 1500 receives A-loop data (after converted from optical to electrical format) on A-loop input line 1502 and B-loop input data (after conversion from optical to electrical format) on B-loop input line 1503. The A-loop input line 1502 is coupled to a first one-shot 1512, while the B-loop input line 1503 is coupled to a second one-shot 1513. The outputs from one-shots 1512, 1513 are coupled to comparators 1525 and 1526 (which may be embodied as, e.g., Schmitt trigger circuits), respectively, and are also both coupled to a logic (e.g, OR) gate 1520. The other inputs of the comparators 1525, 1526 are provided with a threshold voltage level. The output of the logic gate 1520 is coupled to another one-shot 1530, the output of which is in turn connected to a detector 1535. The outputs from the comparators 1525 and 1526 are also coupled as inputs to the detector 1535.

In operation, the detector 1535 detects the first arriving data as between the A-loop input line 1502 and the B-loop input line 1503, and outputs to a downstream component (e.g., a processor) an A/B first-arrival status signal 1539 indicating the first-arriving data, along with status signals 1536, 1537 indicating whether A-loop data and B-loop data, respectively, was detected at all. The first-arriving data on the A-loop input line 1502 and the B-loop input line 1503 triggers either one-shot 1512 (if the data is on the A-loop) or one-shot 1513 (if the data is on the B-loop). When the first-arriving data is detected by either of the one-shots 1512, 1513, the logic gate 1520 propagates the detection signal through to one-shot 1530. In response, one-shot 1530 sends a trigger input signal 1531 to the detector 1535 which examines the inputs from the comparators 1525, 1526 to determine which of the one-shots 1512, 1513 triggered the detection event. The detector 1535 determines upon which loop the data has arrived by examining the outputs of comparators 1525 and 1526. When either one-shot 1512 or 1513 is triggered, the output of the particular one-shot 1512 or 1513 switches states so as to pass above the threshold signal ("TH") 1529 and thereby switch the state of its respective comparator 1525 or 1526. As soon as one-shot 1530 is triggered by the arrival of incoming data on either loop, the detector 1535 can examine the output of comparators 1525, 1526 and determine on which loop the data arrived.

The second-arriving data on the A-loop input line 1502 and the B-loop input line 1503 triggers either one-shot 1512 or one-shot 1513, depending upon whether the second-arriving data is on the A-loop or the B-loop. When the second-arriving data is detected by either of the one-shots 1512, 1513, the corresponding comparator 1525 or 1526 changes states. However, in a preferred embodiment, the detector 1535 does not examine the output of the comparator(s) 1525, 1526 until the pulse output by one-shot 1530 terminates. The detector 1535 may internally comprise a falling edge detector to determine when the pulse output by one-shot 1530 terminates.

Preferably, the duration of the pulses output from one-shots 1512 and 1513 is selected to be longer than the duration of the pulse output from one-shot 1530, so that the falling edge of the output pulse from one-shot 1530 can be used to trigger the detection event on the loop having the second-arriving data. The duration of the pulse 1580 is preferably selected to be longer than the maximum expected or acceptable propagation delay around the A and B loops, so that the test for the second-arriving data will be guaranteed to occur after the data has arrived on the second loop.

Figure 15B:
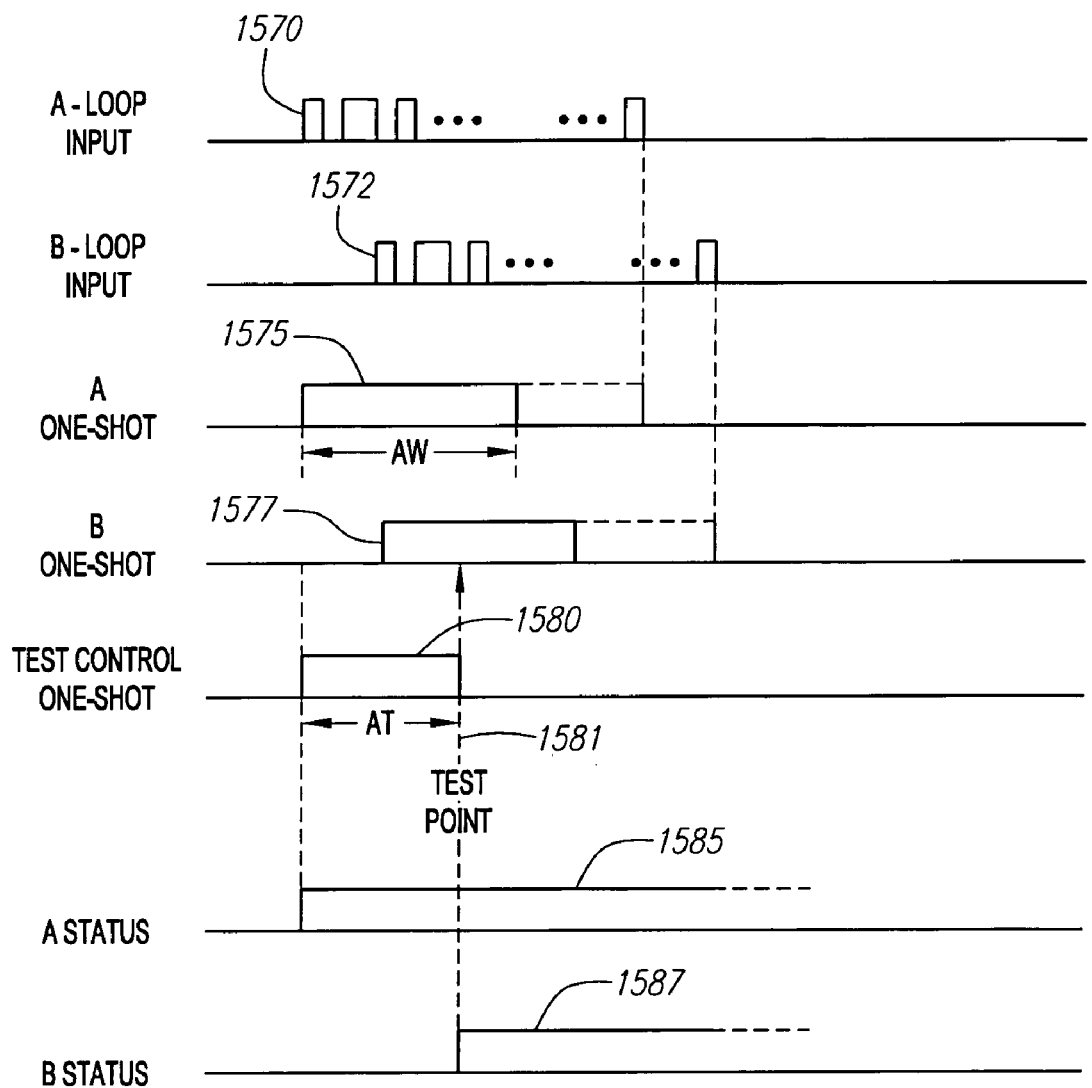
FIG. 15B is a graph of waveforms associated with operation of the arbiter circuit illustrated in FIG. 15A.

The foregoing operation may be illustrated by the waveforms shown in the example of FIG. 15B. Assuming no breakages in the A or B loops, the same data arrives on both the A-loop input line 1502 and the B-loop input line 1503. In the particular example shown in FIG. 15B, the A-loop data 1570 is shown arriving before the B-loop data 1572, due to different propagation delays around the optical loops. Arrival of the A-loop data results in an output pulse 1575 from the A-loop one-shot 1512. Arrival of the B-loop data likewise results in an output pulse 1577 from the B-loop one-shot 1513. Since the A-loop data arrives first, it triggers a pulse 1580 from one-shot 1530. At the positive edge of the pulse 1580, the detector 1535 examines its inputs to determine which data arrived first, and can determine that the A-loop data arrived first. The detector 1535 in response sets the A/B first-arrival status signal 1539 to a value indicating that the A data arrived first. It also asserts the A data status signal 1536 indicating that the A loop data has arrived. At the falling edge of the pulse 1580, the detector 1535 tests the other loop (in this case, the B loop), to check whether the B loop data has arrived. In this example, the B loop data did arrive successfully, so the detector 1535 would then assert the B data status signal 1537 indicating that the B loop data has arrived.

The detector 1535 thereby provides information indicating whether the data arrived on one or both of the A-loop and B-loop, and indicating on which loop the data arrived first. A downstream component (e.g., processor) may use this information to determine, for example, if there is an error condition on one of the two loops, and may also use it to help decide which data to select for further processing.

Once the status signals 1536, 1537, and 1539 are no longer needed by the downstream component or processing, the detector 1535 may receive a reset signal 1542 which causes it to reset the status signals 1535, 1537, and 1539.

In an alternative embodiment, one-shots 1512, 1513 may be replaced by other types of circuit elements, such as multi-shots (i.e., retriggerable one-shots), resettable flip-flops, or other bistable circuit elements. If embodied as multi-shots, then in order to ensure detection of both the A and B data in this scheme, the output pulse 1580 from one-shot 1530 is preferably shorter than the minimum period of assertion of the output pulse of the multi-shot, which may be related to the minimum duration of a message carried on the A or B loop. If, on the other hand, the one-shots 1512, 1513 are embodied as flip-flops, for example, then when data is received on the A-loop input line 1502 (for example), the A-loop flip-flip in the location of one-shot 1512 would change states and hold its output in a high state. The same operation would occur with respect to B-loop input data for a flip-flop substituted in the location of the B-loop one shot 1513. Processing by the remainder of the arbiter circuit 1500 would be the same as described above. When the detector 1535 or network node no longer needs the relative time-of-arrival information, a reset signal 1540 can be used to reset the A and B flip-flops, readying them for the next arriving input data.

Figure 16:
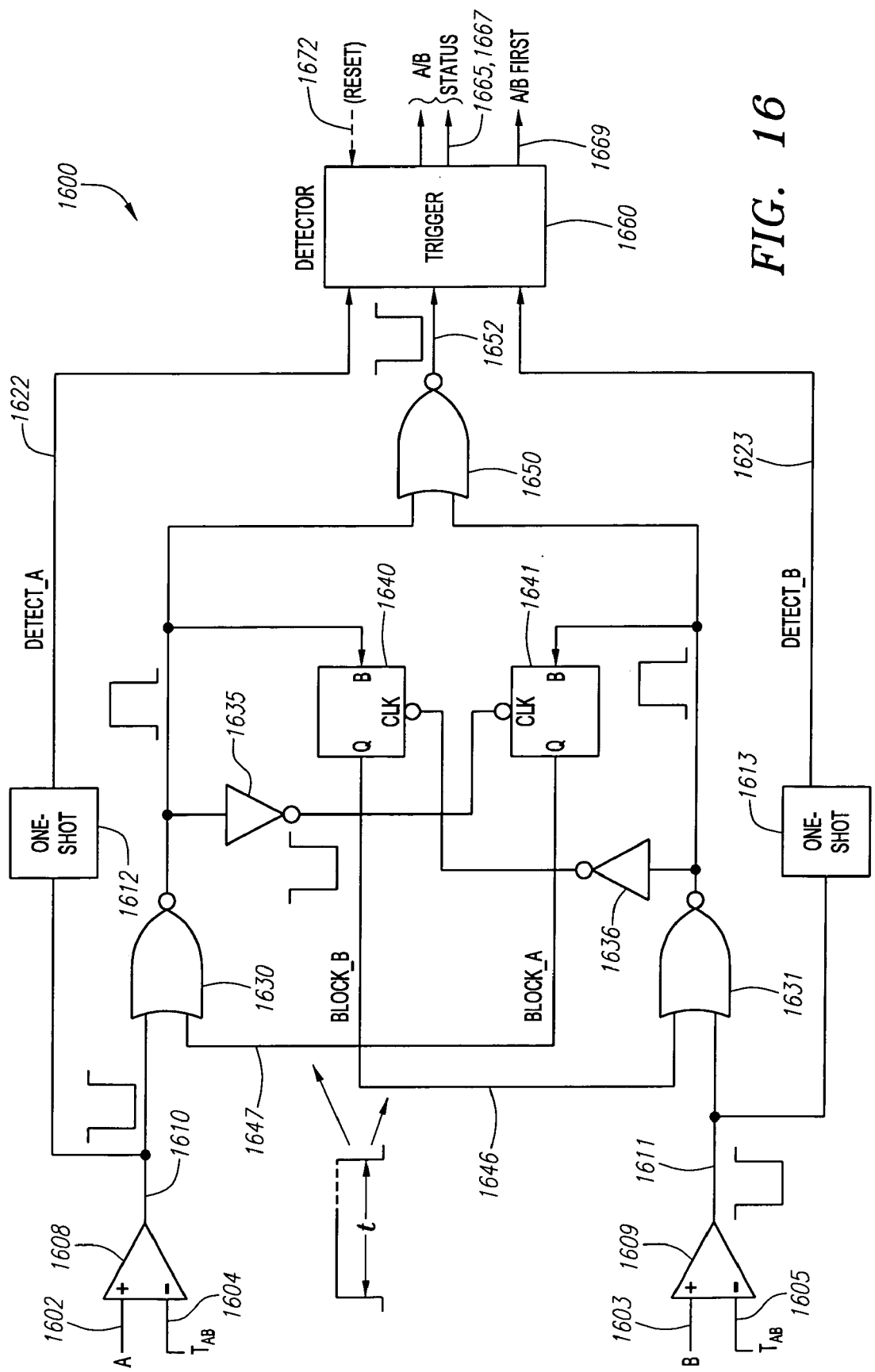
FIG. 16 is a schematic diagram of another embodiment of a receive arbiter circuit.

FIG. 16 is a schematic diagram of another embodiment of an arbiter and detection circuit 1600 as may be used, for example, in the receive arbiter illustrated in FIG. 14. In FIG. 16, the arbiter and detection circuit 1600 receives A-loop data (after converted from optical to electrical format) on A-loop input line 1602 and B-loop input data (after conversion from optical to electrical format) on B-loop input line 1603. The A-loop input line 1602 is coupled to an amplitude thresholding comparator 1608 which ensures that the amplitude of the data signal is above a threshold level $T_{AB}$ established by threshold signal line 1604, thus eliminating low level noise signals. Likewise, the B-loop input line 1603 is coupled to another amplitude thresholding comparator 1609 which ensures that the amplitude of the data signal is above the threshold level $T_{AB}$ established by threshold signal line 1605. Amplitude thresholding comparators 1608 and 1609 may be embodied, for example, as Schmitt trigger circuits or other similar circuits. In the present example, the output pulses generated by amplitude thresholding comparators 1608 and 1609 are based on negative logic (as illustrated by the representative waveforms shown in FIG. 16), but with suitable straightforward modifications to the various components of the arbiter and detection circuit 1600, the amplitude thresholding comparators 1608, 1609 may operate according to positive logic instead.

The output of the A-loop amplitude thresholding comparator 1608 is coupled a first one-shot 1612, which outputs a pulse of predefined length when data is received on the A-loop, while the output of the B-loop amplitude thresholding comparator 1609 is coupled to a second one-shot 1613, which likewise outputs a pulse of predefined length when data is received on the B-loop. The pulses generated by one-shots 1612, 1613 are fed as inputs to a detector 1660, which asserts the appropriate one or both of A/B status lines 1665 and 1667 indicating whether A-loop data or B-loop data, respectively, have arrived. The output pulses generated by one-shots 1612, 1613 are preferably long enough in duration to allow the detector 1660 to perform any desired processing (e.g., determining which of the A-loop and B-loop data arrived first, whether one or both A-loop and B-loop data have arrived, etc.). The duration of the output pulses from one-shots 1612, 1613 may depend upon factors such as the duration of A-loop and B-loop data bits, the duration of A-loop and B-loop data bursts, the size of (and hence expected propagation delay around) the network ring, and so on. As one possible example, for instance, the bit duration of A-loop and B-loop data may be selected as, e.g, 800 nanoseconds, and the duration of the output pulses generated by one-shots 1612, 1613 may be selected to be in the range several hundred (e.g., 400) microseconds. To accommodate different network sizes and data transmission rates, it may be desirable to allow various parameters of the arbiter and detection circuit 1600, such as the output pulse duration of one-shots 1612, 1613, to be programmable in nature.

In addition to being input to one-shots 1612 and 1613, the outputs from amplitude thresholding comparators 1608, 1609 are also passed through logic gates 1630 and 1631, respectively, the outputs from which are both coupled as inputs to a logic gate (e.g., a NOR gate) 1650. The logic gate 1650 outputs a trigger signal 1652 which informs the detector 1660 that data has arrived on either or both of the A-loop or B-loop. The detector 1660 then determines which of the A-loop or B-loop caused the trigger signal 1652 by evaluating the state of the input signals 1622, 1623, and sets an A/B first arrival status line 1669 to an appropriate state (indicating which of the A-loop data or B-loop data arrived first). The detector 1660 may alternatively evaluate other available signals, such as flip-flop output signals 1646 and 1647 (which are described in greater detail below), to determine which of the A-loop and B-loop data arrived first.

The arbiter and detection circuit 1600 further may include various circuitry to, among other things, assist in the detection of the first-arriving data on the A-loop and B-loop and, therefore, in the rapid selection, if desired, between A-loop and B-loop data. The arbiter and detection circuit 1600 may include retriggerable monostable multivibrators 1640 and 1641 having inputs coupled to the respective outputs of logic gates 1630 and 1631. The arbiter and detection circuit 1600 may further include inverters 1635, 1636 which receive inputs from logic gates 1630 and 1631, respectively, and which provide outputs to the "clear" (or reset) signal inputs of the retriggerable monostable multivibrators 1640 and 1641, respectively, as illustrated in FIG. 16. The output from retriggerable monostable multivibrator 1641 is provided as an input to logic gate 1630 on the A-loop processing channel, while the output from retriggerable monostable multivibrator 1640 is provided as an input to logic gate 1631 on the B-loop processing channel.

Operation of the forgoing components of the arbiter and detection circuit 1600 may be described by way of example wherein data over the A-loop arrives prior to data over the B-loop. For the situation in which data arrives first over the B-loop, operation is identical but occurs over the opposite processing channel. Initially, when no data is being received on either the A-loop or the B-loop, the outputs of both logic (NOR) gates 1630, 1631 remain in a low state (e.g., logical "0"). The low output state from logic gate 1631 feeds, via retriggerable monostable multivibrator 1641, to one input of logic gate 1630 and causes the output of logic gate 1630 to remain low since its other input, from A-loop amplitude thresholding circuit 1608, is in a high state (e.g., logical "1") when no data is being received. The same is true with the low output state of logic gate 1630 feeding into logic gate 1631 via retriggerable monostable multivibrator 1640. When data is first received, for example, on the A-loop, the negative pulse generated from A-loop amplitude thresholding circuit 1608 propagates through logic gate 1630, since both its inputs are in a low state for the duration of the pulse. The output of logic gate 1631 transitions to a high state for the duration of the pulse, and propagates via retriggerable monostable multivibrator 1640 to the input of logic gate 1631, thus effectively clamping the output of logic gate 1631 in a low state for the duration of the pulse (and, if retriggered, any subsequent incoming pulses on the A-loop). Should any data arrive over the B-loop during the duration of the pulse output by retriggerable monostable multivibrator 1640, the data will be unable to through logic gate 1631 for the duration of the pulse output by the retriggerable monostable multivibrator 1640. Among other things, this blocking effect prevents any pulse generated by B-loop amplitude thresholding circuit 1609 from being detected by the detector 1660 (via logic gate 1650) for the duration of the pulse output from retriggerable monostable multivibrator 1640. It also prevents any pulse generated by the B-loop amplitude thresholding circuit 1609 from blocking the A loop processing channel. In this regard, the pulse propagated through logic gate 1630 on the A-loop processing channel generates a "clear" (or reset) signal for retriggerable monostable multivibrator 1641. In this example, the clear signal is active low, so the output of logic gate 1630 is first inverted by inverter 1635 before being applied to the clear signal input of the Q flip-flip 1641. Assertion of the clear signal on retriggerable monostable multivibrator 1641 effectively clamps the output of retriggerable monostable multivibrator 1641 in a low state, thus ensuring that logic gate 1630 remains unblocked, allowing the pulse(s) generated by amplitude thresholding circuit 1608 to continue to propagate through for the duration of the A-loop pulse.

The foregoing operation allows the detector 1660 sufficient time to determine which data arrived first as between the A-loop and the B-loop. Should the arrival times be extremely close, the front-end circuitry of the arbiter and detection circuit 1600 will generally force either the A or B processing channel to prevail, or both the A and B processing channels may be permitted to propagate through. For example, if the retriggerable monostable multivibrators 1640 and 1641 respond significantly more quickly to imposition of a "clear" signal input than a trigger input (such as the case with, e.g., type 74HC123 retriggerable monostable multivibrators), then neither Q output from retriggerable monostable multivibrators 1640, 1641 will be asserted, and data from both the A and B processing channels will be permitted to pass through. In the situation where A-loop and B-loop data arrives approximately simultaneously, the selection of data between the A-loop and B-loop is generally not important, all other things being equal.

The detector 1660 outputs various signals indicating whether A or B loop data was received and which arrived first. The detector 1660 may assert only one of A status signal 1665 or B status signal 1667 if data on only the A-loop or B-loop is received, or else may assert both A status signal 1665 and B status signal 1667, indicating that both A-loop data and B-loop data was received. When further data is expected over the fiber optic loops, the detector 1660 may be reset by a processor or other control circuitry downstream. In response, the detector 1660 de-asserts the A and B status lines 1665, 1667 and the A/B first arrival signal line 1669.

Other circuitry (e.g., a processor) in a network node may utilize the A/B arrival status, as well as other information (such as error status), to select between A-loop data and B-loop data for further processing. Other approaches to selecting between A-loop data and B-loop data may also be used.

The circuit architectures illustrated in FIGS. 15A and 16 may provide a network node with the ability to select rapidly between data arriving on both A and B loops, so that processing of the data will not be delayed. They may also provide downstream processing components with useful information about the first-arriving data and the arrival status of both the A-loop and B-loop data. While the circuitry in FIGS. 15A and 16 is configured for two fiber loops, the principles may be extended to an arbitrary number of fiber loops.

Figure 7:
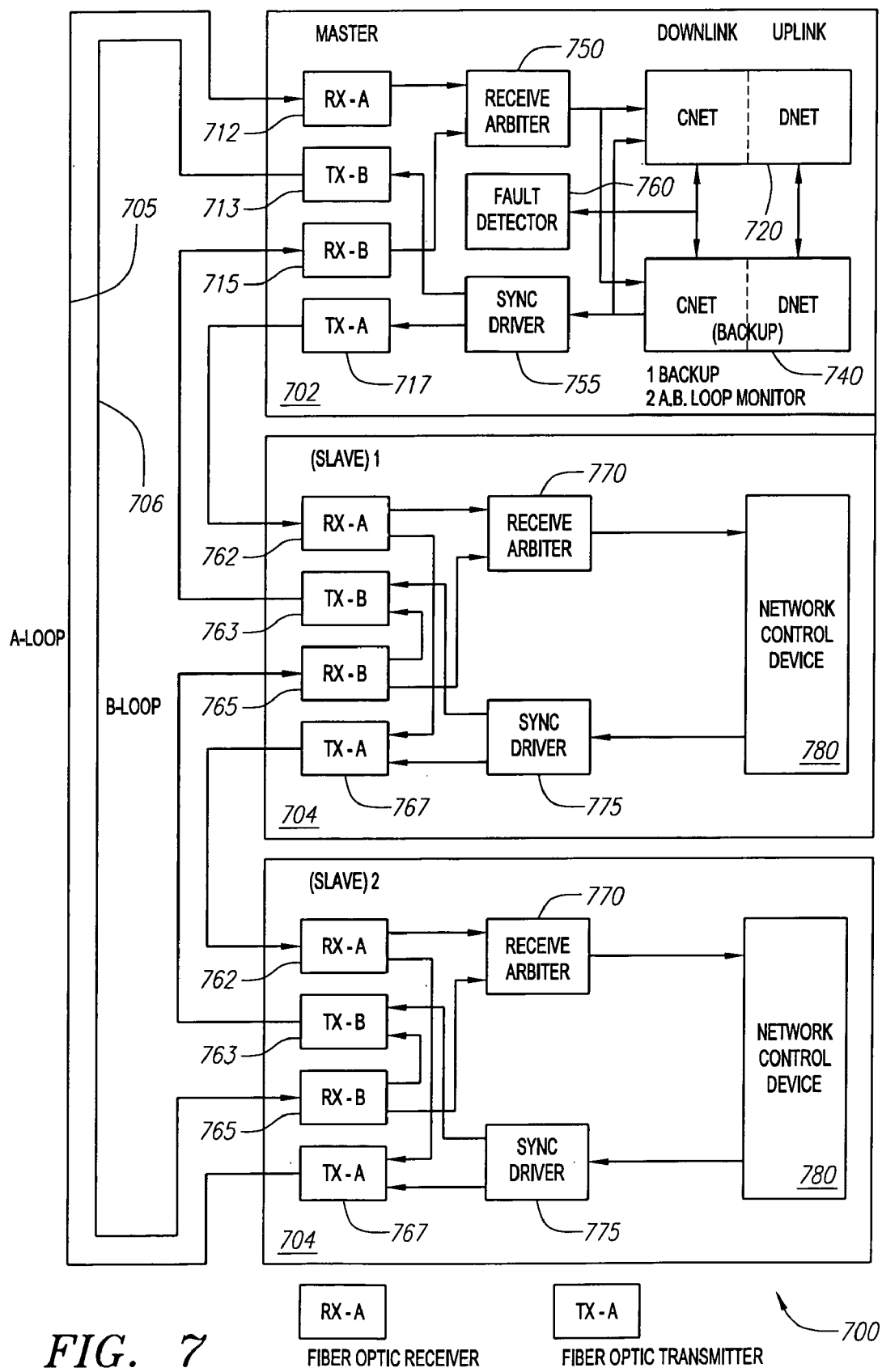
FIG. 7 is a diagram of a master-slave two-fiber ring network, showing certain node details.

Further explanation will now be provided concerning the operation of various control networks in which two fibers (A-loop and B-loop) are employed for bidirectional communication. FIG. 7 is a diagram illustrated a relatively simple example of a master-slave ring network 700 having two fibers, and showing certain node details. In FIG. 7, a master node 702 (which in this example is embodied as a network node 600 such as described with respect to FIG. 6) and two slave nodes 704 are connected by two fibers 705 (A-loop) and 706 (B-loop) in a ring configuration. While two slave nodes 704 are illustrated in FIG. 7, any number of slave nodes 704 may be present.

As with the network node 600 illustrated in FIG. 6, the master node 702 preferably comprises two optical receivers 712, 715 and two optical transmitters 713, 717. The first optical receiver 712 and optical transmitter 717 are associated with the first fiber optic loop (the "A loop") 705, while the second optical receiver 715 and optical transmitter 713 are associated with the second fiber optic loop (the "B loop") 706. In certain embodiments, for example where multiple master nodes exist or where slave nodes have backup master node functionality, then the optical receivers 712, 715 may provide the capability of passing through data directly to the optical transmitters 713, 717. In such an embodiment, the first optical receiver 712 may have an output (not shown) connected to the first optical transmitter 717 to permit propagation of signals around the A loop, and the second optical receiver 715 may likewise have an output (not shown) connected to the second optical transmitter 713 to permit propagation of signals around the B loop.

Both optical receivers 712, 715, similar to the network node 600 in FIG. 6, preferably have outputs connected to a receive arbiter 750 which, as previously explained, selects between data from optical receivers 712, 715 for further processing. Both optical transmitters 713, 717 may be simultaneously driven by a synchronizing driver 755. In the particular example illustrated in FIG. 7, the master node 702 comprises two processors 720, 740, one of which serves as the primary processor and the other of which serves as a backup processor in case the primary processor fails. A fault detector 760 is communicatively connected to both the processors 720, 740, allowing detection of faults as further described herein.

The slave nodes 704 in the example of FIG. 7 each comprise a two optical receivers 762, 765 and two optical transmitters 763, 767. The first optical receiver 762 and first optical transmitter 767 are associated with the first fiber optic loop (the 'A loop') 705, while the second optical receiver 765 and second optical transmitter 763 are associated with the second fiber optic loop (the "B loop") 706. The optical receivers 762, 765 preferably pass through data directly to the optical transmitters 763, 767. Accordingly, the first optical receiver 762 has an output connected to the first optical transmitter 767 to permit propagation of signals around the A loop 705, and the second optical receiver 765 likewise has an output connected to the second optical transmitter 763 to permit propagation of signals around the B loop 706. Both optical receivers 762, 765 preferably have outputs connected to a receive arbiter 760 (as may be embodied according to any of FIGS. 14, 15A, and 16) which selects between data from optical receivers 762, 765 for further processing. Both optical transmitters 763, 767 are driven by a synchronizing driver 775.

The master node 702 may communicate with the slave nodes 704 according to any desired protocol. In a preferred embodiment, the master node 702 polls the slave nodes 704 periodically, according to, for example, graph 202 shown in FIG. 2, or according to any other suitable protocol.

When transmissions occur from the master node 702 to the slave nodes 704, the master node 702 preferably transmits on both the A-loop 705 and the B-loop 706 simultaneously, but in opposite directions (as indicated by the arrows in FIG. 7). The synchronizing driver 755 ensures that the transmissions on both the A-loop 705 and the B-loop occur simultaneously. However, in certain embodiments, it may be desirable to gate the output of the synchronizing driver 755 or otherwise make its output selectable, so that the integrity of the A-loop 705 and the B-loop 706 can be separately and independently tested. The same would be true for the slave nodes 704 where it is possible for the slave nodes 704 to take over the functionality of the master node 702 in the case of a master node failure.

The first slave node 704 in the "clockwise" direction, i.e., "Slave-1" in this example, directly receives the transmission from optical transmitter 717 of the master node 702 on the A-loop 705, while the first slave node 704 in the "counter-clockwise" direction, i.e., "Slave-2" in this example, directly receives the transmission from optical transmitter 713 of the master node 702 on the B-loop 706. Slave-1 immediately propagates the received signal on the A-loop 705 from the A-loop receiver 762 to the A-loop transmitter 767, whereupon the message is carried forward to Slave-2 on the A-loop 705. Likewise, Slave-2 immediately propagates the received signal on the B-loop 706 from the B-loop receiver 765 to the B-loop transmitter 763, whereupon the message is carried forward to Slave-2 on the B-loop 706. Similarly, Slave-1 immediately propagates the received signal on the B-loop 706 from the B-loop receiver 765 to the B-loop transmitter 763, whereupon the message is carried forward to the master node 702 on the B-loop 706, thus allowing the B-loop message to make a complete loop, and Slave-2 immediately propagates the received signal on the A-loop 705 from the A-loop receiver 762 to the A-loop transmitter 767, whereupon the message is carried forward to the master node 702 on the A-loop 705, thus allowing the A-loop message to make a complete loop.

If any additional slave nodes 704 were present, the A-loop message would be propagated in a "clockwise" direction from slave node to slave node in the same manner until eventually reaching the master node 702 on the A-loop 705, and the B-loop message would be propagated in a "counter-clockwise" direction from slave node to slave node in the same manner until eventually reaching the master node 702 on the B-loop 706.

At each slave node 704, assuming no breakages on the transmission fibers or other disruptions to communication, a message will be received on both the A-loop 705 and the B-loop 706. Each slave node 704 selects one of the two messages for further processing (or a combination of the two if errors are present but a complete message can be reconstructed from both receptions), and the slave node 704 then determines whether the message from the master node 702 was intended for the particular slave node and/or if a response is required. Selection between the two messages can be based upon the first arriving message (using an arbiter circuit such as described with respect to FIGS. 14, 15A, and 16), the number of errors in the received messages (if any), or a combination of the two. If a response to the received message is required, then, at a prescribed interval dictated by the particular communication protocol in use, the slave node 704 responds with a return message transmitted via the synchronizing driver 775 and optical transmitters 763, 767 over both the fibers 705, 706.

The return message from each slave node 704 is propagated in both a "clockwise" and "counter-clockwise" direction by virtue of the two fibers 705, 706. For example, a return message transmitted by the first slave node 704 (Slave-1) will propagate in a "clockwise" direction around the A-loop fiber 705, via the second slave node 704 (Slave-2) to the master node 702. The return message will propagate in a "counter-clockwise" direction around the B-loop fiber 706 to the master node 702. The master node 702 will receive the return message on both the A-loop fiber 705 and B-loop fiber 706, through optical receivers 715 and 712, respectively. The return message, in this particular example, is conveyed to a receive arbiter circuit 750, which makes a decision as to which version of the return message (or combination of the two versions) to utilize for further processing.

A similar type of operation occurs for a message transmitted by the master node 702 to the Slave-2 slave node 704, and a return message transmitted by the Slave-2 slave node 704 back to the master node 702. In other words, the master node message is transmitted in opposite directions along both fibers 705, 706 from the master node 702 to the Slave-2 slave node 704, and the return message is transmitted in opposite directions along both fibers 705, 706 from the Slave-2 slave node 704 back to the master node 702. When the receiving slave node 704 (either Slave-1 or Slave-2) receives a master node message intended for it, which is not a broadcast message intended for multiple slave nodes 704, the receiving slave node 704 may, in certain embodiments, be configured such that the slave node 704 does not propagate the message any further around the loop. However, in a preferred embodiment, the slave node 704 propagates the master node message around the remainder of the loop until the master node 702 receives its own message back at its receiver 712 or 715. Among other things, this approach assists the master node 702 in detecting fault conditions.

The format of master node and slave node messages transmitted within the network 700 depend upon the particular type of network, protocol, and other such factors. For example, a message may comprise a series of data bits divided into various fields, and may be encoded, if desired, for security, error detection/correction, or other such purposes. According to one example, for instance, a master node message format includes one or more start delimiter data bits, a node identification field (and optionally additional message header fields), a master data message field, and one or more stop delimiter data bits; and the slave node message format includes a slave data message field a message authentication code ("MAC") or other integrity code, and, optionally, one or more header fields as well. Also, optionally, the slave node message format may include a variable-length error field in which a slave node 704 can inject an error code indicating the type of observed error/fault and the location of the error (e.g., a node identification). The slave node 704 may inject the error code when a master node message or slave node message is being propagated through the slave node 704. The error code may indicate, by way of example, that the slave node 704 did not receive a complete message, that it observed errors in the data bits or authentication code, that the signal strength from the preceding node was weak, and other types of conditions which may be of use to the master node 702.

In its response message, the slave node 704 can also include various types of error codes. By way of example, the slave node 704 may indicate in its return message to the master node 702 that it failed to receive the master node message on both the A-loop 705 and the B-loop 706. The master node may use such information to identify and locate faults in either or both of the loops 705, 706.

In many situations, as suggested in the preceding description, it is desirable to be able to detect a fault and locate its proximity within the network. The two fiber ring network 700 described in FIG. 7 has certain advantages in this regard, which may be explained with reference to the various FIGS. 8A–8C, 9A–9B, 10A–10D, 11A–11B, and 12A–12D. In each of these figures is shown a simplified two fiber ring network diagram with a single master node M and three slave nodes S1, S2, and S3. A fault may include a situation in which one or both optical fibers in the ring are severed or otherwise damaged. In certain cases, crimping of a fiber can delay propagation of the optical signal to such a degree that effective operation under the network's communication protocol is effectively inhibited. Therefore, delayed reception of a propagated signal may be deemed a fault in certain contexts, and a given node may utilize an internal timer mechanism to determine if an expected message has arrived within an acceptable time period according to the network's particular communication protocol. A fault may also occur where a node's processor fails, or where one or more of it's receivers or transmitters fail. Most of these situations will manifest by the failure of a message to be propagated around the network ring on one or both of the optical fibers. A fault may also occur where the fiber is physically damaged such that a transmission is degraded beyond a tolerable level.

Figure 8A:
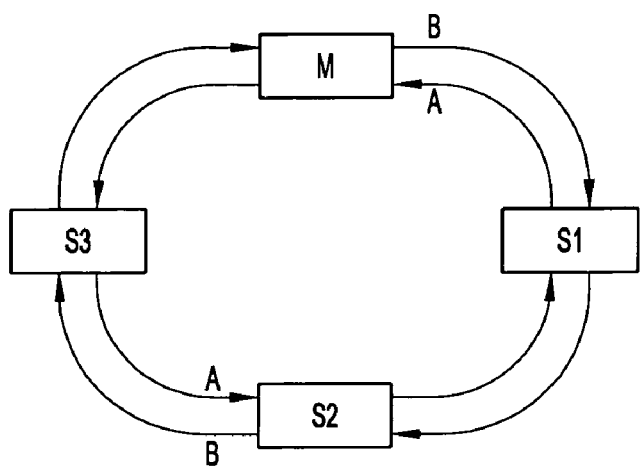
FIGS. 8A, 8B and 8C are diagrams illustrating an example of normal communications in a two fiber ring network.
Figure 8B:
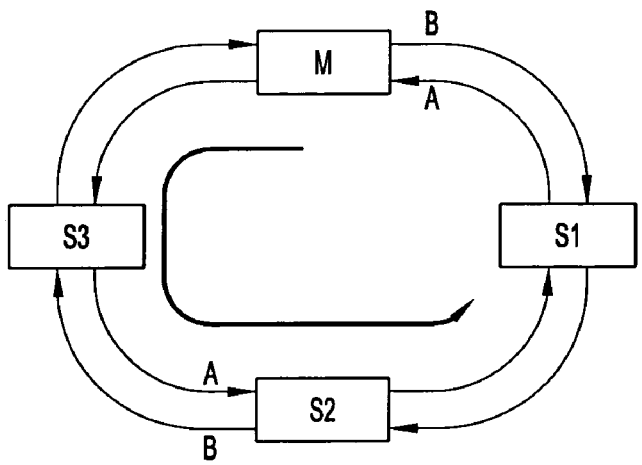
Figure 8C:
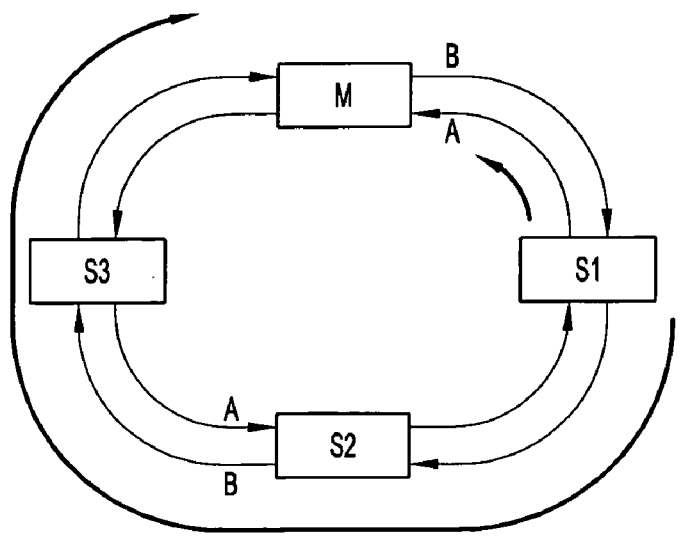

FIGS. 8A–8C illustrate a situation where there is normal operation in the absence of a fault. FIG. 8A shows a basic ring network architecture. FIG. 8B illustrates communication by the master node M to a given slave node, in this example S1. As illustrated by the arrows in FIG. 8B, the transmission from the master node M propagates in a "clockwise" direction around loop B to the first slave node S1, and in a "counter-clockwise" direction around loop A to the first slave node S1. Both messages reach the first slave node S1, which responds, as illustrated in FIG. 8C, on both loop A and loop B. The master node M detects the response on both loop A and loop B and assumes that no fault exists. Since the master node M will receive responses from all the slave nodes S1, S2, and S3 on both loop A and loop B, it will know that no detectable fault exists.

Figure 9A:
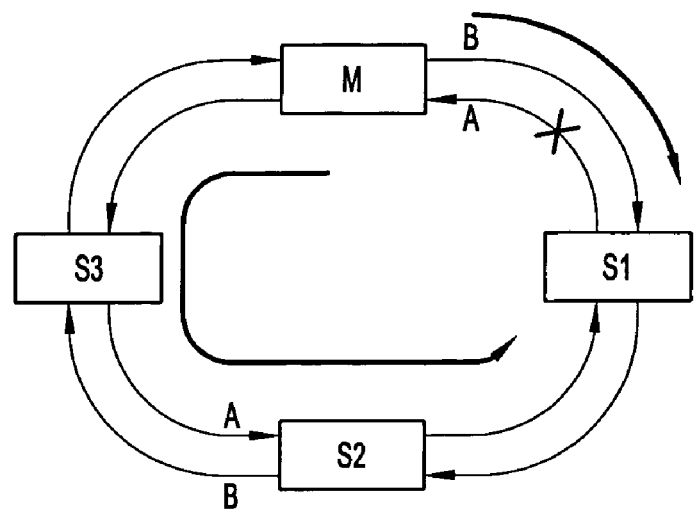
FIGS. 9A and 9B are diagrams illustrating detection of a single fiber fault adjacent to a master node in a two fiber ring network.
Figure 9B:
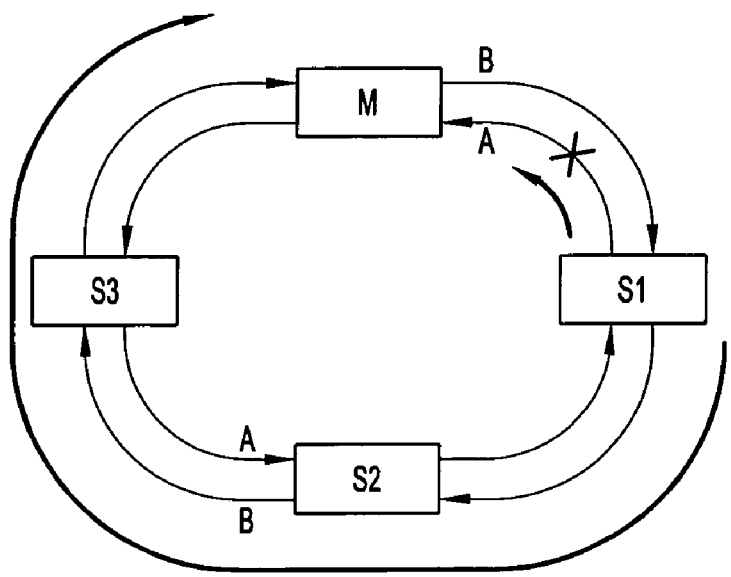

FIGS. 9A–9B illustrate the situation of a single fiber fault adjacent to the master node M. In FIGS. 9A and 9B, a fault is indicated by the "X" on loop A between the master node M and the first slave node S1. As illustrated by the arrows in FIG. 9A, a transmission from the master node M propagates in a "clockwise" direction around loop B to the first slave node S1, and in a "counter-clockwise" direction around loop A to the first slave node S1. Both messages reach the first slave node S1, which responds (and/or propagates the master node message), as illustrated in FIG. 9B, only on loop B because the fault on loop A interferes with the transmission from the first slave node S1. The master node M detects a response from the first slave node S1 on loop B but not loop A. A similar situation will occur with each of the other slave nodes S2 and S3. Because the master node M receives no communication on loop A whatsoever, but does receive a message on loop B, it knows that a fault exists adjacent to it (or that the first slave node S1 has failed to propagate a transmission from another slave node S2 or S3 if the return message was sent by a different slave node).

Figure 10A:
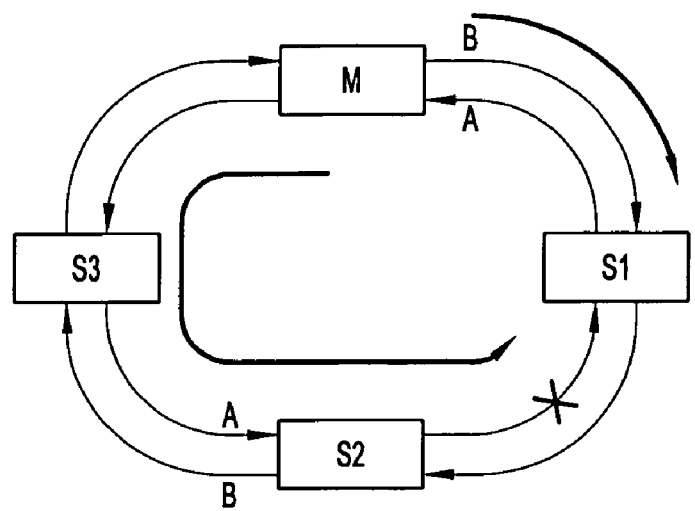
FIGS. 10A through 10D are diagrams illustrating detection of a single fiber fault not adjacent to a master node in a two fiber ring network.
Figure 10B:
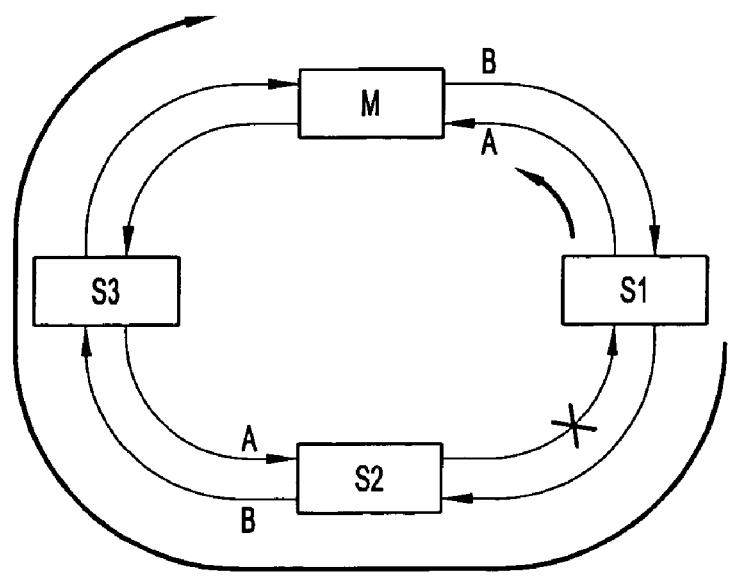

FIGS. 10A through 10D are diagrams illustrating detection of a single fiber fault not adjacent to a master node in a two fiber ring network. In FIGS. 10A through 10D, a fault is indicated by the "X" on loop A between slave nodes S1 and S2. As illustrated by the arrows in FIG. 10A, a transmission from the master node M propagates in a "clockwise" direction around loop B to the first slave node S1, and in a "counter-clockwise" direction around loop A to the first slave node S1. Only the message on loop B reaches the first slave node S1, however, because the fault on loop A interferes with the propagation of the master node message from the second slave node S2 to the first slave node S1. The first slave node S1 responds, as illustrated in FIG. 10B, on both loop A and loop B, and both messages reach the master node M. In its return message the slave node S1 may optionally include an error code indicating that it did not receive the master node message on loop A, thus alerting the master node to the existence of a likely fault on the A loop somewhere between the master node M and the first slave node S1.

Figure 10C:
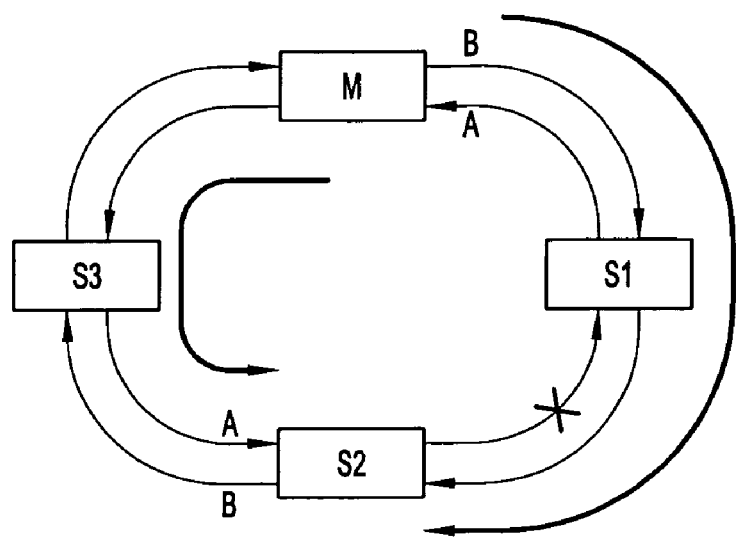
Figure 10D:
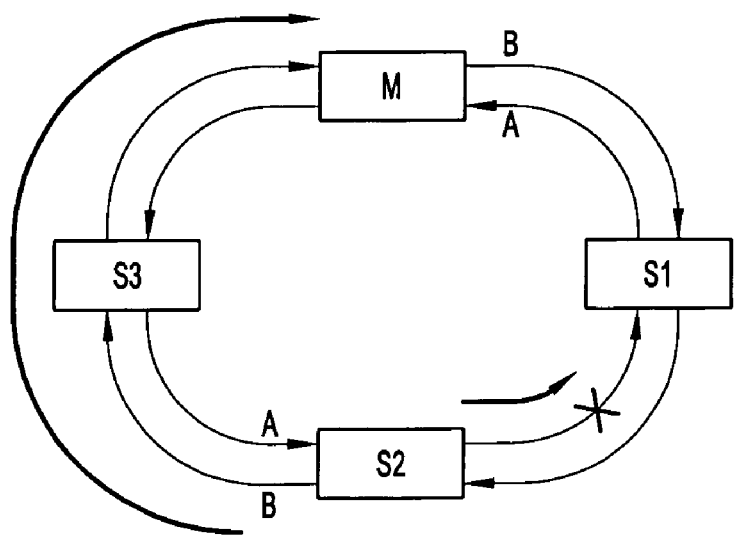

With or without an inserted error code from the first slave node S1 indicating the presence of a fault, the master node M can pinpoint the location of the fault by systematically polling the slave nodes S1, S2, and S3. Thus, as illustrated in FIG. 10C, a second transmission from the master node M propagates in a "clockwise" direction around loop B to the second slave node S2, and in a "counter-clockwise" direction around loop A to the second slave node S2. This time, both messages reaches the second slave node S2, which responds, as illustrated in FIG. 10D, only on loop B because the fault on loop A interferes with the transmission from the second slave node S2 to the master node M. The master node M detects a response from the second slave node S2 on loop B but not loop A. A similar situation will occur with the third slave node S3. Because the master node M receives no communication on loop A from the second slave node S2, but is able to receive a message on loop A from the first slave node S1, the master node M can determine that a fault exists on the A loop between the second slave node S2 and the first slave node S1 (or that the second slave node S2 has failed to propagate a transmission from another slave node S3 if the return message was sent by a different slave node).

Figure 11A:
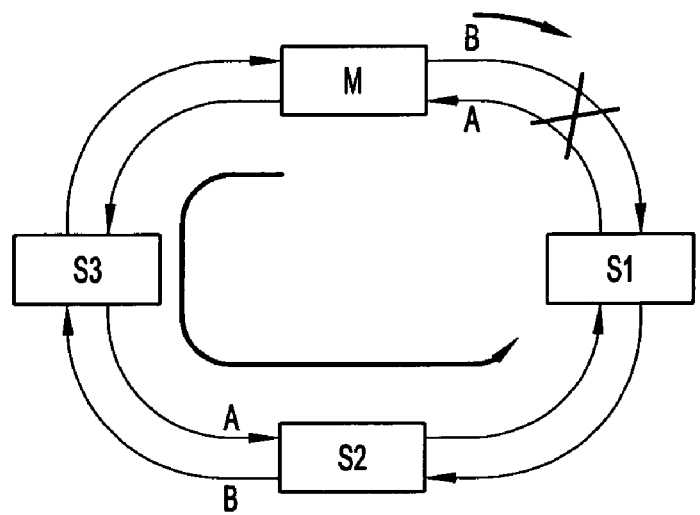
FIGS. 11A and 11B are diagrams illustrating detection of a double fiber fault adjacent to a master node in a two fiber ring network.
Figure 11B:
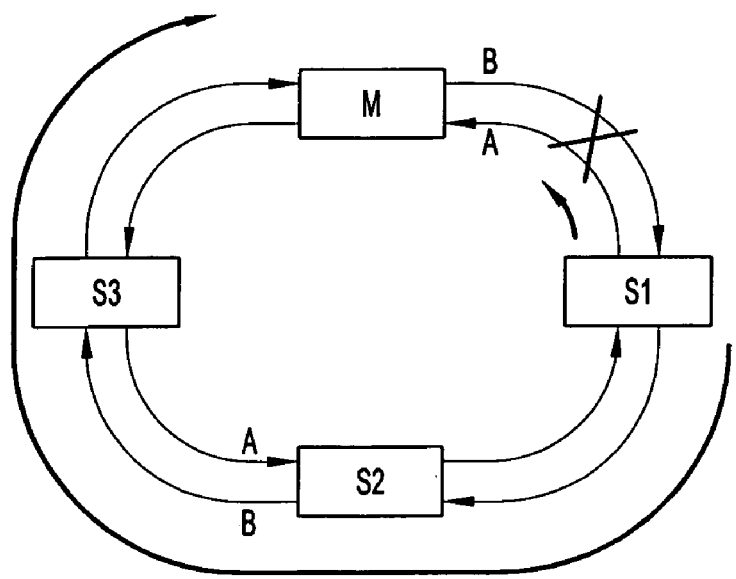

FIGS. 11A and 11B are diagrams illustrating detection of a double fiber fault adjacent to a master node in a two fiber ring network. In FIGS. 11A and 11B, a fault is indicated by the "X" on loop A and loop B between the master node M and the first slave node S1. As illustrated by the arrows in FIG. 11A, a transmission from the master node M propagates in a "counter-clockwise" direction around loop A to the first slave node S1, but the message traveling around loop B in the "clockwise" direction does not reach first slave node S1 due to the fault on loop B. Because at least one of the two messages reaches the first slave node S1, it responds, as illustrated in FIG. 11B, only on loop B because the fault on loop A interferes with the transmission from the first slave node S1 to the master node M. The master node M detects a response from the first slave node S1 on loop B but not loop A. A similar situation will occur with each of the other slave nodes S2 and S3. Because the master node M receives no communication on loop A whatsoever, but does receive a message on loop B, the master node M can determine that a fault exists on the A loop adjacent to it (or that the first slave node S1 has failed to propagate a transmission from another slave node S2 or S3 if the return message was sent by a different slave node).

The master node M may further determine that a fault exists on the B loop adjacent to it in the direction of the first slave node S1, if the slave nodes are configured to insert an error code indicating that the master node message was not received on both loops. Thus, the master node M would learn from the first slave node S1's return message that the first slave node S1 did not receive the master node message on the B loop, thus indicating a fault adjacent to the master node M on the B loop in the direction of the first slave node S1.

FIGS. 12A through 12D are diagrams illustrating detection of a double fiber fault not adjacent to a master node in a two fiber ring network. In FIGS. 12A through 12D, a fault is indicated by the "X" on loop A and loop B between slave nodes S1 and S2. As illustrated by the arrows in FIG. 12A, a transmission from the master node M propagates in a "clockwise" direction around loop B to the first slave node S1, and in a "counter-clockwise" direction around loop A to the first slave node S1. Only the message on loop B reaches the first slave node S1, however, because the fault on loop A interferes with the propagation of the master node message from the second slave node S2 to the first slave node S1. The first slave node S1 responds, as illustrated in FIG. 10B, on both loop A and loop B, but only the message on loop A reaches the master node M because the message traveling on loop B is blocked by the fault between the first slave node S1 and the second slave node S2. In its return message, the slave node S1 may optionally include an error code indicating that it did not receive the master node message on loop A, thus alerting the master node to the existence of a likely fault on the A loop somewhere between the master node M and the first slave node S1.

Figure 12A:
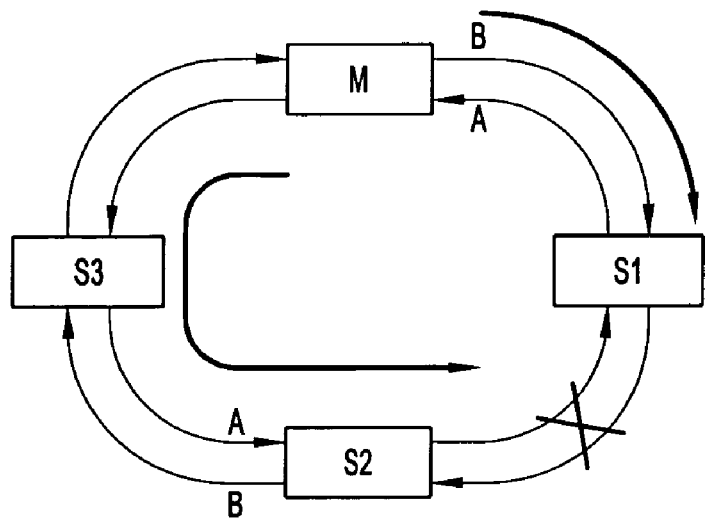
FIGS. 12A through 12D are diagrams illustrating detection of a double fiber fault not adjacent to a master node in a two fiber ring network.
Figure 12B:
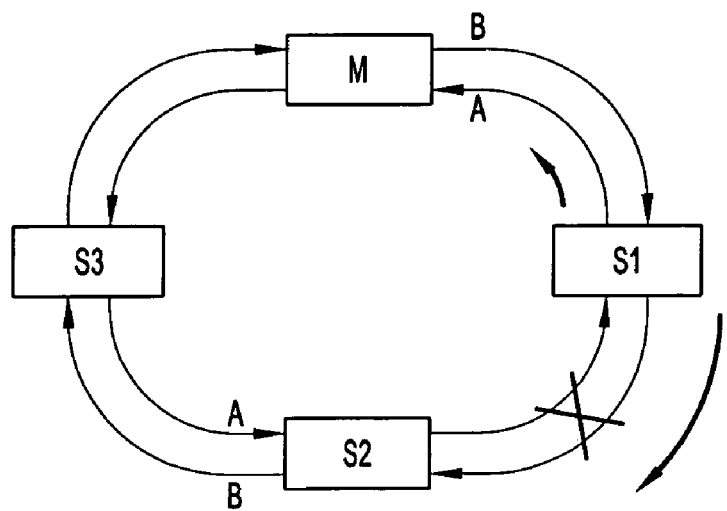
Figure 12C:
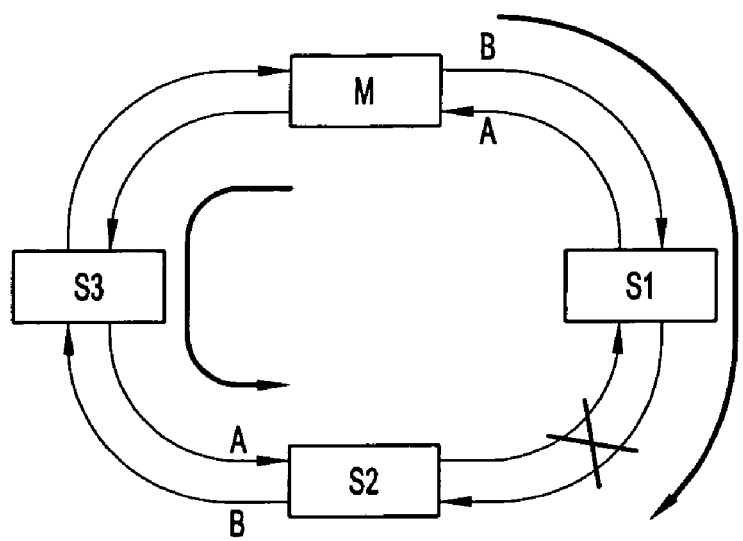
Figure 12D:
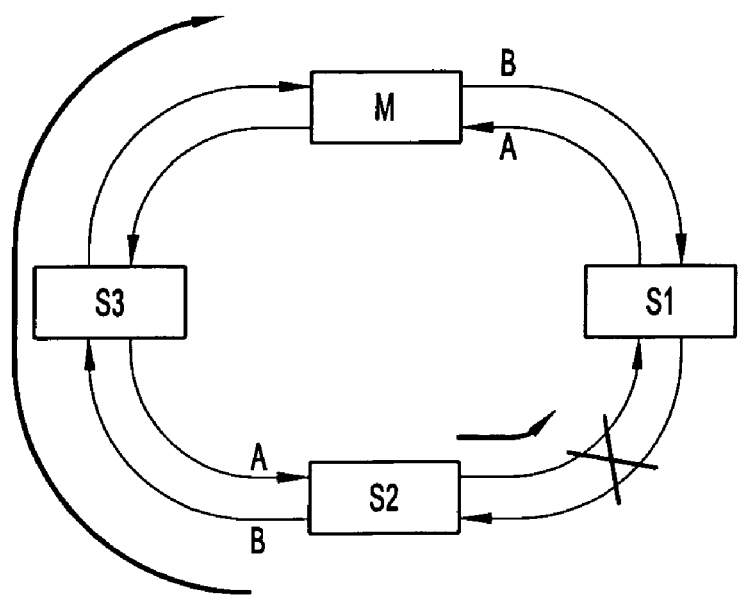

With or without an inserted error code from the first slave node S1 indicating the presence of a fault, the master node M can pinpoint the location of the fault by systematically polling the slave nodes S1, S2, and S3. Thus, as illustrated in FIG. 12C, a second transmission from the master node M propagates in a "clockwise" direction around loop B to the second slave node S2, and in a "counter-clockwise" direction around loop A to the second slave node S2. This time, the master node message reaches the second slave node S2 on loop A but not on loop B, which is the opposite of the way in which the first master node message reached the first slave node S1. As illustrated in FIG. 12D, the second slave node S2 response is received only on loop B, but not on loop A, because the fault on loop A interferes with the transmission from the second slave node S2 to the master node M. This is again the opposite situation as the return message from the first slave node S1, which was received on loop A but no loop B. The master node M detects the response from the second slave node S2 on loop B but not loop A and, by comparing with the result from the first slave node S1 in which the return message was received on loop A but no loop B, determines that a double fault exists on both the A loop and the B loop between the second slave node S2 and the first slave node S1.

Thus, employing a suitable protocol and systematic polling or message exchange, the master node M can detect single or double faults at various locations throughout the network loop.

In an alternative embodiment, the master node M detects a fault in either of the A loop or the B loop by selectively controlling whether to transmit on both loops simultaneously or only a single loop at a time. The master node M may, for example, periodically run a loop verification routine to check for faults. The master node M may transmit master node messages systematically to each slave node S1, S2, and S3, and may await a response from the slave node S1, S2, and S3 on both the A loop and the B loop. If a slave node fails to respond at all in response to a message sent on, for example, the A loop, then the master node M may infer that a fault exists on the A loop prior to the particular slave node. The master node M may isolate the location of the fault by systematically polling each of the slave nodes until one of them responds, and if none of the slave nodes respond the master node M may infer that the fault is immediately adjacent to the master node M. By undertaking this test independently on the A loop and the B loop, the master node M may pinpoint the location of faults in the network ring. Also, such fault detection can be done without the need, as may be carried out in certain alternative embodiments, for the slave nodes to insert an error code indicating whether or not a master node message was received by the slave node on both loops.

Figure 21:
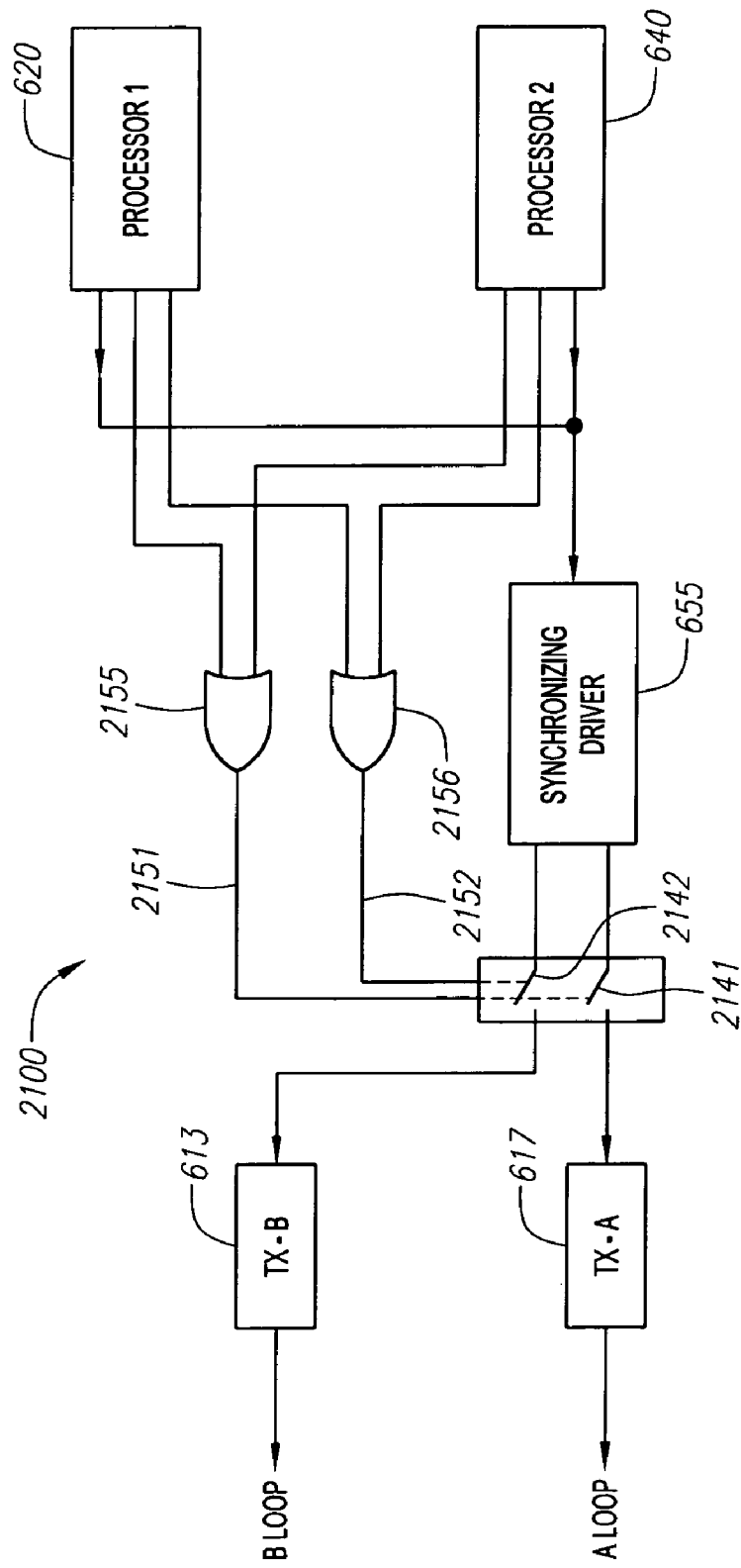
FIG. 21 is a diagram of a portion of a master node with independently controllable communication over A and B loops.

To provide for the capability to selectively transmit on either both loops simultaneously or independently on either individual loop, the master node M may be modified to incorporate selection circuitry associated with its transmission circuitry. Where the master node M is embodied, for example, as a node 600 as shown in FIG. 6, the master node may be modified as shown in FIG. 21, which illustrates a portion of the master node. As shown in FIG. 21, the master node 2100 includes a first processor 620 and a second processor 640, similar to FIG. 6, and also includes a synchronizing driver 655 which has outputs in electrical communication with the A loop transmitter 617 and B loop transmitter 613. The master node 2100 is modified by the inclusion of A and B control gates 2141, 2142, which selectively apply the output of the synchronizing driver 655 to the A loop transmitter 617 and B loop transmitter 613, respectively. The A and B control gates 2141, 2142 are controlled by control lines 2151, 2152, respectively, output from processors 620, 640. In this particular embodiment, because either processor 620, 640 can control gates 2141 and 2142, the control signals output from the processors 620, 640 are combined through logic gates 2155 and 2156.

A variety of other selection means for selectively transmitting over one or both of the A loop fiber and B loop fiber may also be utilized.

In various embodiments, it may be desirable to provide slave nodes which serve a secondary functionality as a master node in case of failure by the master node, thereby increasing the redundancy and reliability of the overall network. One example of such a system will be described with respect to the network shown in FIG. 8A, although it will be understood that the principles may be applicable to other networks as well, including multi-master and/or single-fiber networks. Failure of the current master node commonly results in the master node either failing to transmit, or else transmitting improper control information to the slave nodes. According to a preferred redundant backup control protocol, the slave nodes periodically receive master-control messages from the master node and, in the event that proper master-control messages fail to appear, initiate a failure mode response procedure.

In operation, in accordance with one embodiment, the slave nodes S1, S2, . . . monitor the A loop and B loop while in a "listen" mode and await periodic master node messages from the master node M. Upon a failure to receive a transmission from the master node M on either the A loop or B loop within an expected time interval from a previously observed transmission, the slave nodes S1, S2, . . . begin to time a wait period (which, as described in more detail below, is preferably a different wait period for each slave node in the network). When the wait period elapses, the slave node determines that a failure in the master node for the particular data bus has occurred, and takes steps to take over the functionality of the master node.

Each of the slave nodes is preferably programmed with a different wait period, so that no contention occurs for replacing the master node M when a master node failure has occurred. In one aspect, backup control of each master node is prioritized, such that there is a specific order in which the slave nodes can potentially take over control of the master node functionality when a failure has occurred.

Each of the nodes (master and slave) may be provided with hardware components that facilitate operation in a network having redundant backup master capability. Each of the nodes, for example, may comprise an uplink mode processor and a downlink mode processor. With particular reference to, e.g., FIG. 6, each of the nodes may comprise an uplink mode processor such as "DNET" 622 (or 642 if provided with an internal backup processor or processors) and a downlink mode processor such as "CNET" 621 (or 641 if provided with an internal backup processor or processors). The "CNET" processor 621 and "DNET" processor 622 may comprise, e.g., co-processors which collectively form a portion of processor 620, in addition to the supporting circuitry such as RAM (which may be dual-port in nature), ROM, and other digital components as may be provided. The downlink or "CNET" processor 621 acts as a "master" processor and controls the other nodes in the network. There may be one master node or multiple master nodes in a particular ring network, but if multiple master nodes are present then each master node preferably controls a distinct subset of slave nodes as described previously with respect to FIG. 1. The uplink or "DNET" processor 622 acts as a "slave" processor and responds to a master node in the ring network.

In the example illustrated in FIG. 8A, the master node M would, in this embodiment, utilize its downlink or "CNET" processor 621 to control the slave nodes S1, S2, and S3. The slave nodes S1, S2, and S3 would receive, process, and respond to master node messages using their uplink or "DNET" processor. (Both the "CNET" and "DNET" processors 621, 622 and 641, 642 connect or have access to the A loop and B loop). Upon a failure of the master node, as detected by, e.g., a timeout of a predetermined wait period, then one of the slave nodes (for example, S1) takes over as the new effective master node. The slave node S1 then employs its downlink processor "CNET" 621 to control the other two slave nodes S2 and S3. The slave node S1 may continue to transmit messages to its own uplink transceiver "DNET" 622 so that slave node S1 can continue to carry out its former duties prior to the master node failure, or else it can control itself internally to continue to carry out those duties.

In a preferred embodiment, detection of a master node failure condition is accomplished using an internal timer mechanism, such as a hardware or software timer accessible (either directly or indirectly) by the uplink processor "DNET" 622. Under a particular configuration, the slave node receives master node messages periodically from the master node M. The master node M may thereby, for example, request status information from the slave node, or instruct the slave node to carry out certain control or input/output functions. The slave node ordinarily responds by carrying out the requested functions and/or sending an acknowledgment or status signal to the master node M using the uplink processor "DNET" 622. The internal timer mechanism of the slave node times out a wait period between master node messages received from the master node M. Each time the uplink processor "DNET" 622 detects a master node message from the master node M that is recognized as an appropriate master node message within the particular programmed control protocol (whether or not the master node message is directed to the particular slave node), the uplink processor "DNET" 622 resets the internal timer mechanism. If the internal timer mechanism ever times out, then the uplink processor "DNET" 622 responds by asserting a failure mode response procedure. The timing out of the internal timer mechanism may result in an interrupt to downlink processor "CNET" 621 in order to inform the downlink processor "CNET" 621 of a perceived master node failure, or else, for example, the downlink processor "CNET" 621 may periodically monitor the internal timer mechanism and commence a failure mode response procedure when it observes that the timer has timed out, or else the uplink processor "DNET" 622 may set a flag in a dual port RAM (not shown) which is checked periodically by the downlink processor "CNET" 621.

When the downlink processor "CNET" 621 has been informed or otherwise determined that a failure mode condition exists, and that the master node M has presumably failed, the downlinkg processor "CNET" 621 takes over as the new effective master node. When the failure mode is entered, the downlink transceiver "CNET" 621 may be programmed so as to directly carry out the I/O port functions for which it previously received instructions from the first-tier master node, or the node may send master control messages to its own uplink processor "DNET" 622, either externally via the A loop and/or B loop or internally via the dual port RAM or other means, and thereby continue to carry out the I/O port functions or other functions as it had previously been doing. In other words, the node can give itself control instructions so that it can continue to perform its previously assigned functions. If, after taking over for the master node M, the slave node's downlink processor "CNET" 621 should fail, the node can still continue to perform its assigned functions when the next slave node S2 takes over control as the new effective master node, because its uplink processor "DNET" 622 may continue to function in a normal manner in a slave mode.

According to the foregoing technique, a given slave node thereby substitutes itself for the master node M upon the detection of a master node failure as indicated by the failure to receive the expected master node control messages.

The order in which the slave nodes S1, S2, . . . take over for the master node M may be dictated by the wait period timed by the internal timer mechanism of the particular slave node. The internal timer mechanism for each slave node is preferably programmed or reset with a different time-out value. A given slave node only asserts a failure mode condition when its internal timer mechanism reaches the particular timeout value programmed for that particular node.

The foregoing techniques thereby may provide redundant backup for the master node M in a control network, without necessarily requiring, for example, additional physical nodes to be located within the control network, and without having to provide wiring for such additional physical nodes to the optical loops A and/or B. The redundant backup for the master node M is also accomplished in a manner resolving potential contention problems that might otherwise occur if more than one the slave nodes detected a master node failure and simultaneously attempted to take control as effective master of the control network.

Figure 13:
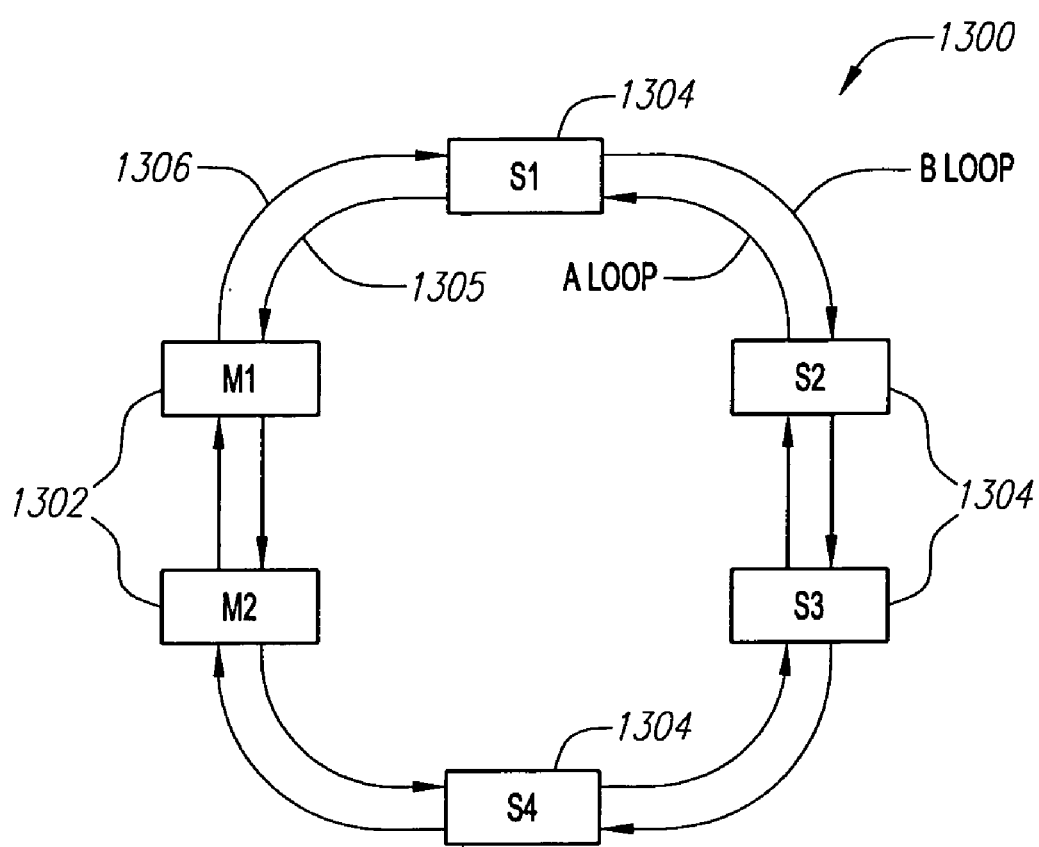
FIG. 13 is a top-level diagram of a master-slave two-fiber ring network having two master nodes.

FIG. 13 is a top-level diagram of another embodiment of a ring network and, in particular, illustrates a master-slave two-fiber ring network 1300 having two master nodes. The ring network 1300 illustrated in FIG. 13 is similar to the ring network 100 shown in FIG. 1, except that it uses two fibers (an A loop fiber 1305 and a B loop fiber 1306) for communication among the various network nodes. Similar to FIG. 1, each node 1302, 1304 of the ring network 1300 can transmit a modulated optical signal a wavelength (or more than one wavelength) that can be detected by downstream nodes. Data is transmitted from an originating node to a destination node by passing through each intervening node on the optical fiber 1305 or 1306. The nodes 1302, 1304 may support either unidirectional or bidirectional communication on either the optical fiber 1305 or 1306, although in the present example the nodes 1302, 1304 transmit in opposite directions on the two fibers 1305, 1306—that is, in a "clockwise" direction on the B loop fiber 1306 and a "counter-clockwise" direction on the A loop fiber 1305.

In the particular example illustrated in FIG. 13, the nodes 1302, 1304 connected by optical fibers 1305, 1306 generally include both master nodes 1302 and slave nodes 1304. Similar to the ring network 100 of FIG. 1, a feature of the ring network 1300 of FIG. 13 is that the network comprises multiple master nodes 1302—in this example, two master nodes 1302 (designated M1 and M2). The ring network 1300 also comprises a number of slave nodes 1304 (designated S1, S2, S3, and S4). The two master nodes 1302 share concurrent control over the slave nodes 1304 in a manner similar to that explained with respect to FIG. 1.

Accordingly, in a preferred embodiment, each master node 1302 controls a designated subset of the slave nodes 1304. For example, master node M1 may control slave nodes S1 and S2, while master node M2 may control slave nodes S3 and S4. The master nodes 1302 may communicate with the slave nodes 1304 according to any suitable protocol or technique. In a preferred embodiment, the master nodes 1302 use a polling scheme to communicate with individual slave nodes 104 in sequence, during ordinary operation. The master nodes 1302 may also, from time to time, issue broadcast messages intended for multiple nodes 1302 and/or 1304.

The master nodes 1302 may share communication over either one of optical fibers 1305, 1306 through a time division multiplexing technique. An example of a timing protocol by which the two master nodes 1302 share communication over an optical fiber 1305 or 1306 is illustrated in FIG. 2, assuming again that the first master node M1 controls slave nodes S1 and S2, and the second master node M2 controls slave nodes S3 and S4. Communication among the master nodes 1302 and slave nodes 1304 is preferably synchronized such that a particular node transmits an originating message in both directions of the ring network 1300, i.e., on both the A loop fiber 1305 and the B loop fiber 1306. For example, the first master node M1 may transmit a master node message to the first slave node S1 in both directions of the ring network 1300, with the master node message being transmitted in a "clockwise" direction on the B loop fiber directly to the first slave node, and on the A loop fiber 1305 in a "counter-clockwise" direction via the second master node M2 and slave nodes S4, S3, and S2, in that order. The first slave node S1 then responds with a return message transmitted in opposite directions on the two fibers 1305, 1306 also. In such a scheme, the timing pattern illustrated in FIG. 2 can be used to control communication among the various nodes 1302, 1304, with each master transmission interval or slave transmission interval being applicable to transmissions over both the A loop fiber 1305 and the B loop fiber 1306. Other protocols besides that illustrated in FIG. 2 may also be utilized, depending upon the requirements of the particular ring network 1300.

Either master node M1 or M2 can be configured to take over for the other master node in the event of a master node failure. In such a case, a single master node M1 or M2 would then control all of the slave nodes S1, S2, S3, and S4. In an alternative embodiment, the second master node M2 does not ordinarily communicate with the slave nodes, but rather functions primarily as a backup master node for the first master node M1. In such an embodiment, the first master node M1 normally controls all of the slave nodes S1, S2, S3, and S4. If the first master node M1 should fail, the second master node M2 may take over its functionality. A variety of different failure detection techniques can be used by the backup master node M2 to detect when the first master node M1 has failed. In alternative embodiments, the slave nodes S1, S2, . . . can be configured with backup master node functionality, and can take over for the master node in the event of a master node failure, as previously described herein in connection with various other embodiments.

The network architecture illustrated in FIG. 13 can have particular advantages insofar as reliability is concerned. The presence of two master nodes M1 and M2 provides backup in case of a master node failure. The use of two optical fibers 1305 and 1306 in the ring network provides for redundancy of the communication path in the event that one or both optical fibers 1305, 1306 has a fault.

Figure 17:
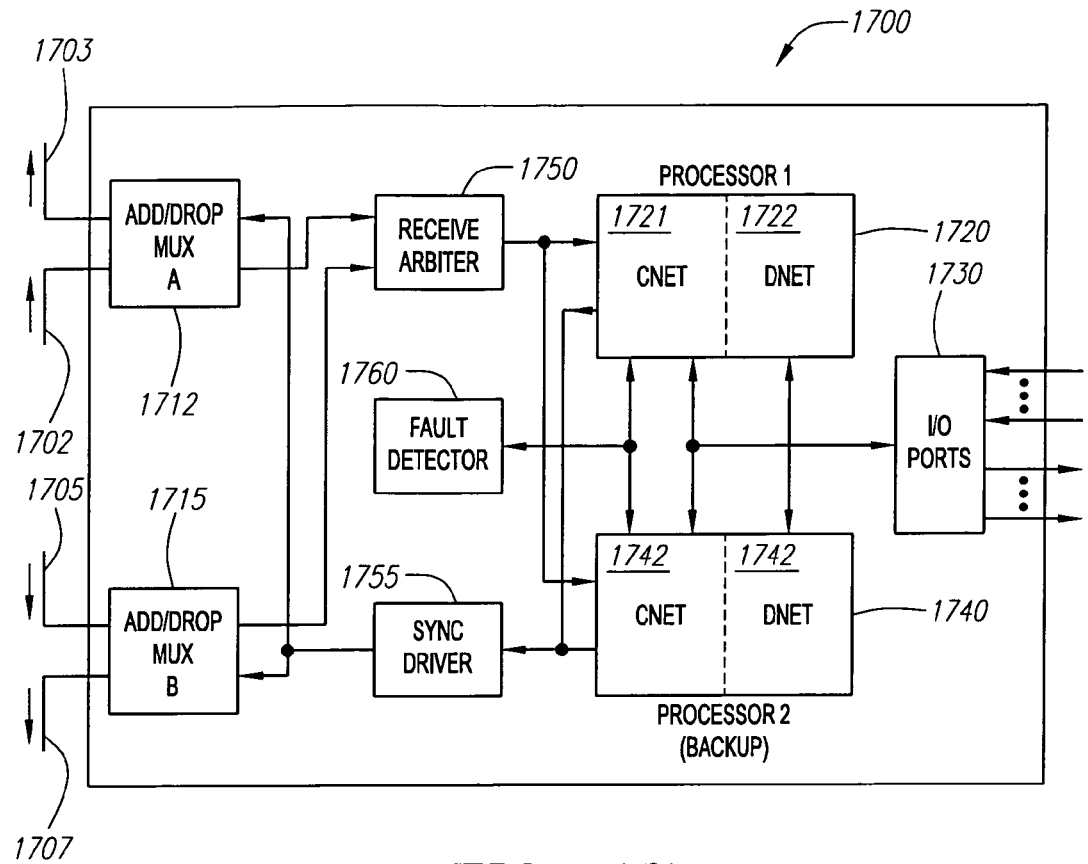
FIG. 17 is a block diagram of a network node for a two fiber ring network, using add/drop multiplexers.

FIG. 17 is a block diagram of an alternative embodiment of network node 1700 for use a two fiber ring network. The network node 1700 illustrated in FIG. 17 utilizes add/drop multiplexers to propagate signals around the ring, and may be utilized in various network architectures as described elsewhere herein. The processors 1720, 1740, receive arbiter 1750, fault detector 1760, and synchronizing driver 1755 may be constructed in a manner similar to that described with respect to the node 600 of FIG. 6 described previously herein. In place of optical transmitters 617, 613 and optical receivers 612, 615, the node 1700 utilizes add/drop multiplexers 1712 (for the A loop) and 1715 (for the B loop). The construction of add/drop multiplexers is well known in the art and therefore a detailed explanation thereof is not deemed necessary herein. An example of an add/drop multiplexer suitable for certain types of ring networks is described, for example, in U.S. Pat. Nos. 6,192,173 B1 and 5,442,623, both of which are hereby incorporated by reference as if set forth fully herein. The add/drop multiplexers 1712, 1715 may allow communication using different colors and/or wavelengths of light.

Figure 18:
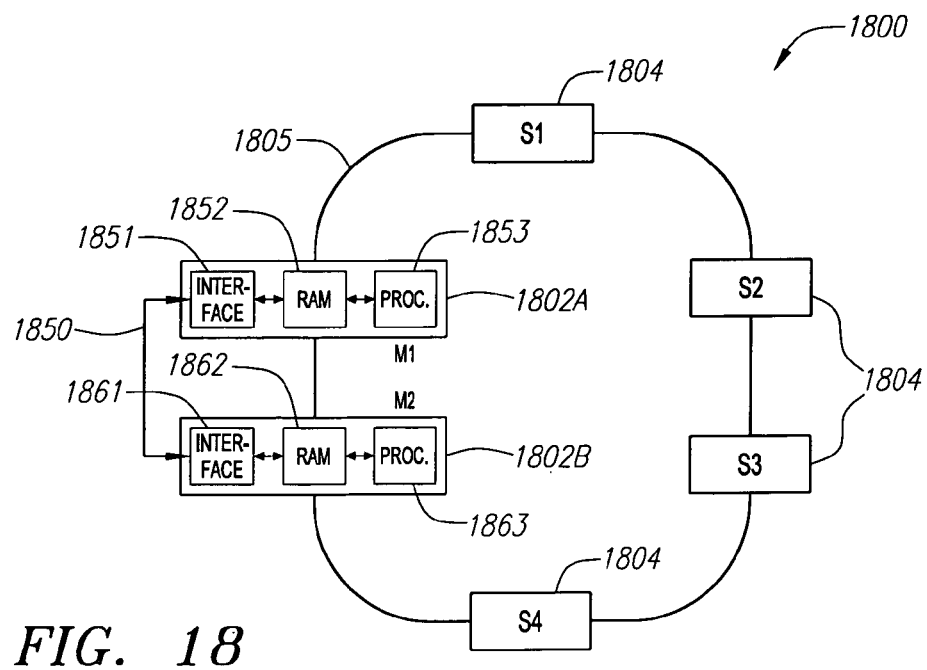
FIG. 18 is a block diagram of a master-slave ring network with a separate fiber used for memory coherency among master nodes.

FIG. 18 is a block diagram of a master-slave ring network 1800 similar to the network 100 illustrated in FIG. 1, but with a separate fiber used for memory coherency among master nodes M1 and M2. As illustrated in FIG. 18, similar to FIG. 1, a pair of master nodes M1, M2 (or additional master nodes, if desired) are connected in a ring architecture with multiple slave nodes 1804 (designated S1, S2, . . . ). Each master node M1, M2 preferably controls a designated subset of the slave nodes 1804. For example, master node M1 may control slave nodes S1 and S2, while master node M2 may control slave nodes S3 and S4. The master nodes M1, M2 may communicate with the slave nodes 1804 according to any suitable protocol or technique, such as, for example, the protocols or techniques described with respect to FIG. 1 or elsewhere herein.

Each master node M1, M2 comprises, among other things, a processor 1853 or 1863 (or multiple processors), a volatile memory such as RAM 1852 or 1862, and a memory coherency interface 1851 or 1861. Each master node M1, M2 also comprises various other internal components such as shown, for example, in FIG. 6, but the details thereof have been omitted for purposes of clarity. A memory coherency optical fiber 1850 connects the memory coherency interface 1851 of the first master node M1 to the memory coherency interface 1861 of the second master node M2.

In normal operation, the master node M1 operates to control a first distinct subset of the slave nodes (e.g., S1 and S2), while the second master node M2 operates to control a second distinct subset of the slave nodes (e.g., 53 and S4). The first master node M1 may utilize its RAM 1852 for various ongoing control operations, while the second master node M2 may likewise utilize its RAM 1862 for various ongoing control operations. Preferably, each of the RAMs 1852 and 1862 is partitioned or otherwise logically divided such that a designated portion of the RAM 1852 or 1862 relates to a particular subset of slave nodes 1804. Each time a master node M1 makes a change to its RAM 1862 (through a read, write, or other such operation), the memory coherency interface 1851 of the first master node M1 detects the change and notifies the memory coherency interface 1861 of the second master node M2 of the details of the change. The memory coherency interface 1861 of the second master node M2 then makes the same change to the RAM 1862 of the second master node M2. Because the RAM 1862 is partitioned according to the subsets of slave nodes 1804, there should be no risk that the memory coherency interface 1861 will overwrite any data being utilized by the second master node M2 to control its slave nodes 1804.

A similar operation occurs when the second master node M2 makes changes to its RAM 1862. Any changes are detected by the second master nodes M2's memory coherency interface 1861 and sent to the first master node M1 via the memory coherency fiber 1850. The master nodes thus may use the memory coherency fiber 1850 as a "broadcast" fiber or loop for ensuring that all of the master RAMs hold the same data at a given time. Further, master node transmissions over the memory coherency fiber 1850 may include a checksum to ensure integrity of data being placed in the master RAM.

If the first master node M1 should fail, the second master node M2 may take over as effective master node with respect to the first subset of slave nodes 1804 (i.e., S1 and S2) with the present state of the first master node M1 intact prior to or at the time of failure, by virtue of the memory coherency operation performed by the master nodes M1 and M2. Likewise, should the second master node M2 fail, the first master node M1 may take over as effective master node with respect to the second subset of slave nodes 1804 (i.e., S3 and S4) with the present state of the second master node M2 intact prior to or at the time of failure. The memory coherency capability provided by the architecture of the network in FIG. 18 thus allows master node backup while preserving the state of the portion of the network that failed.

In a variation of the above embodiment, the first master node M1 may control all of the slave nodes S1, S2 . . . in the network 1800, while the second master node M2 may serve only as a backup master node in case of a failure by the first master node M1. The second master node M2 may yet keep track of the current state of the first master node M1 via the memory coherency fiber 1850. The second master node M2 may also analyze the operation of the first master node M1 by virtue of the changes it detects to the RAM 1851 of the first master node M1.

If the slave nodes S1, S2, . . . are capable of taking over as effective master node in case of a master node failure, as described with respect to other embodiments elsewhere herein, then the slave nodes capable of so doing may also be connected to the memory coherency fiber, so that their internal memory will be in an updated condition should the current master node fail and the slave node be needed to take over as effective master node.

While the network 1800 is illustrated with a single fiber optic ring 1805, it will be understood that the principles and concepts described with respect to FIG. 18 are applicable to multi-fiber networks as well, such as, for example, the ring network 700 illustrated in FIG. 7.

Figure 20:
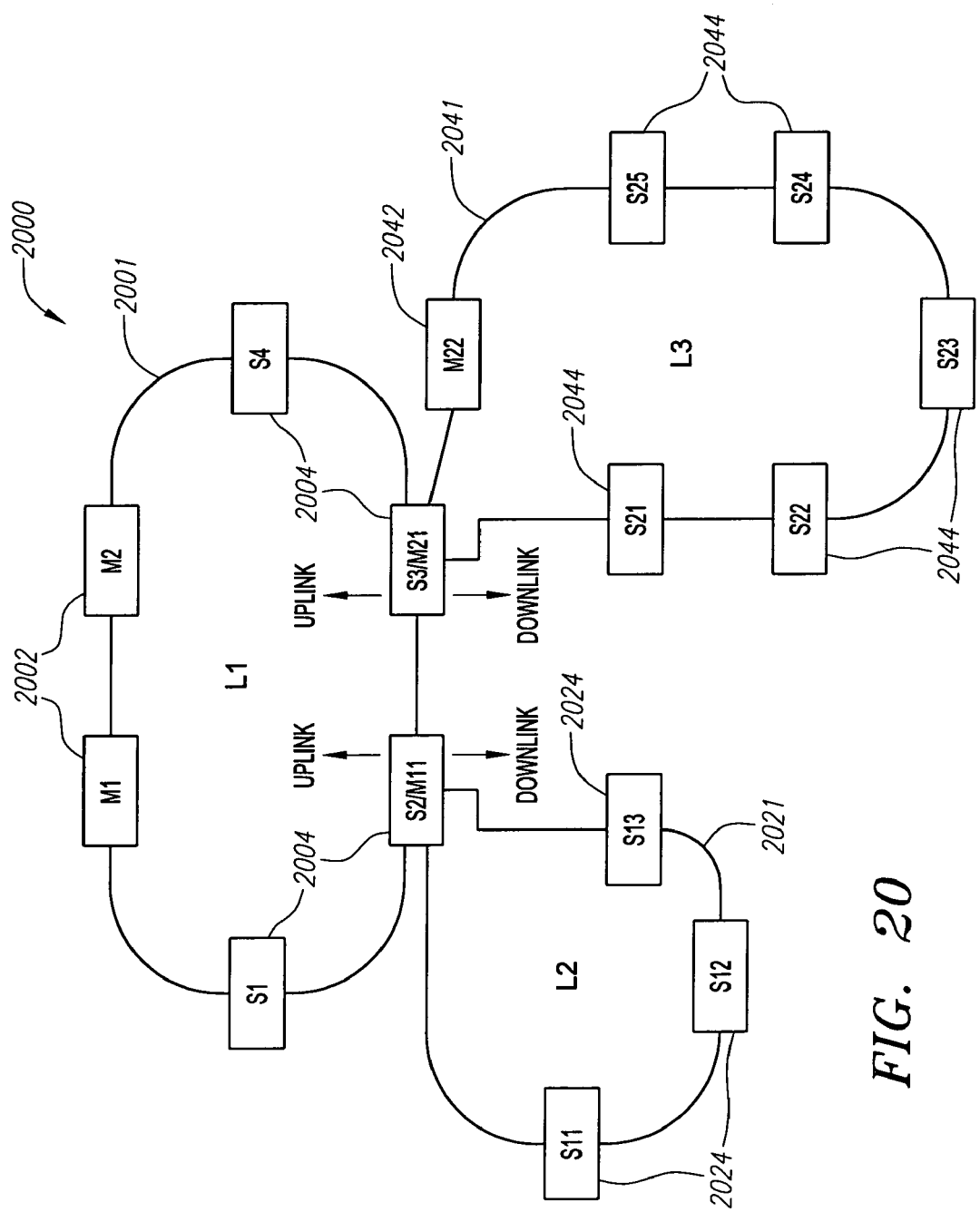
FIG. 20 is a top-level diagram of a multi-tier, hierarchical master-slave fiber optic ring network.

FIG. 20 is a top-level diagram of a master-slave fiber optic ring network 2000 in accordance with another embodiment as disclosed herein. In FIG. 20, the ring network 2000, in one aspect comprises a multi-tier, hierarchical master-slave network. As illustrated, the ring network 2000 includes a first-tier fiber optic ring 2001 (designated "L1") and two second-tier fiber optic rings 2021, 2041 (designated "L2" and "L3"). The first-tier fiber optic ring 2001 connects one or more first-tier master nodes 2002 (in this example, two first-tier master nodes M1 and M2 are shown) and one or more first-tier slave nodes 2004. In this example, there are four first-tier slave nodes 2004, designated S1, S2, S3, and S4. The two first-tier master nodes M1 and M2 may share concurrent control over the first-tier slave nodes S1, S2, S3, and S4 in a manner similar to that described with respect to FIG. 1.

Two of the first-tier slave nodes S2 and S3 in the example of FIG. 20 are each connected to a second-tier fiber optic ring 2021 and 2041, respectively, in addition to the first-tier fiber optic ring 2001, and are each configured to act as a second-tier master node with respect to their respective second-tier fiber optic ring 2021 or 2041. Thus, the first-tier slave node S2 is configured to operate as a second-tier master node M11 with respect to the second-tier fiber optic ring 2021, and may therefore operate to control second-tier slave nodes S11, 212, and S13 connected to the second-tier fiber optic ring 2021. Likewise, the first-tier slave node S3 is configured to operate as a second-tier master node M21 with respect to the second-tier fiber optic ring 2041, and may therefore operate to control second-tier slave nodes S21, S22, S23, S24, and S25 connected to the second-tier fiber optic ring 2041. In this particular example, the first-tier slave/second-tier master node S3/M21 may be configured to share concurrent control of the slave nodes 2044 connected to second-tier fiber optic ring 2041 with another second-tier master node M22, thus employing multi-master control techniques at a second-tier network level. Multi-master control may be effectuated, for example, according to the techniques described previously herein with respect to FIG. 1.

For nodes such as first-tier slave/second-tier master nodes S2/M11 and S3/M21 to operate in both a slave capacity (with respect to an upper tier fiber optic ring) and a master capacity (with respect to a lower tier fiber optic ring), the nodes are preferably outfitted with multiple processors, at least one processor configured as an uplink processor (for the upper tier fiber optic ring) and at least one other processor configured as a downlink processor (for the lower tier fiber optic ring). The uplink and downlink processors (not shown in FIG. 20) may communicate with one another via internal communication paths within the nodes. The first-tier master nodes M1 and M2 may communicate indirectly with slave nodes at the lower tiers by sending commands to the first-tier slave/second-tier master nodes S2/M11 and S3/M21, which receive the commands with their uplink processors and pass the commands internally along to their downlink processors. The downlink processors then convey the commands to the appropriate second-tier slave node(s) 2024 or 2044.

Figure 22:
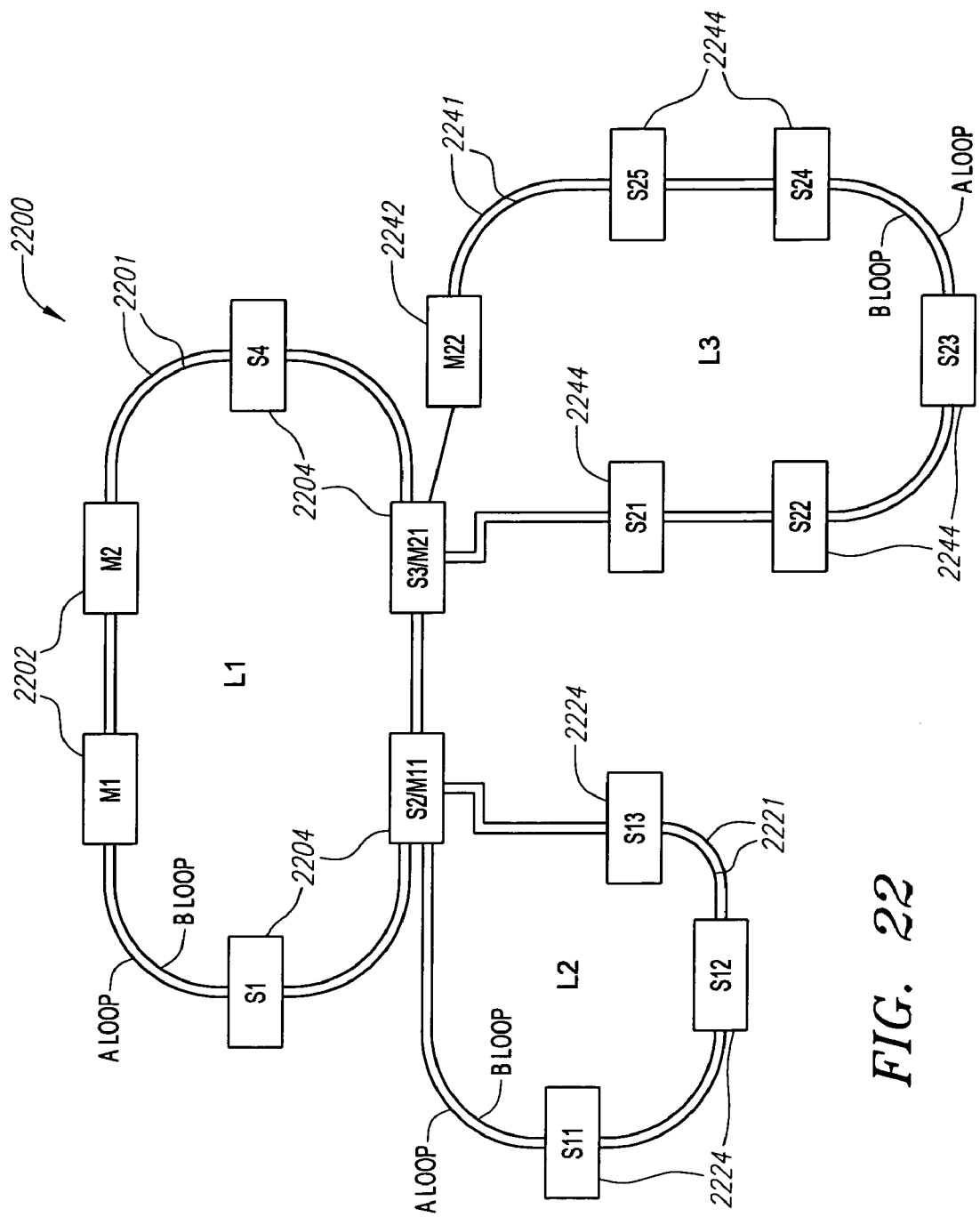
FIG. 22 is a top-level diagram of a multi-tier, hierarchical master-slave fiber optic ring network similar to FIG. 20 but with multiple fibers in each ring.
Figure 23:
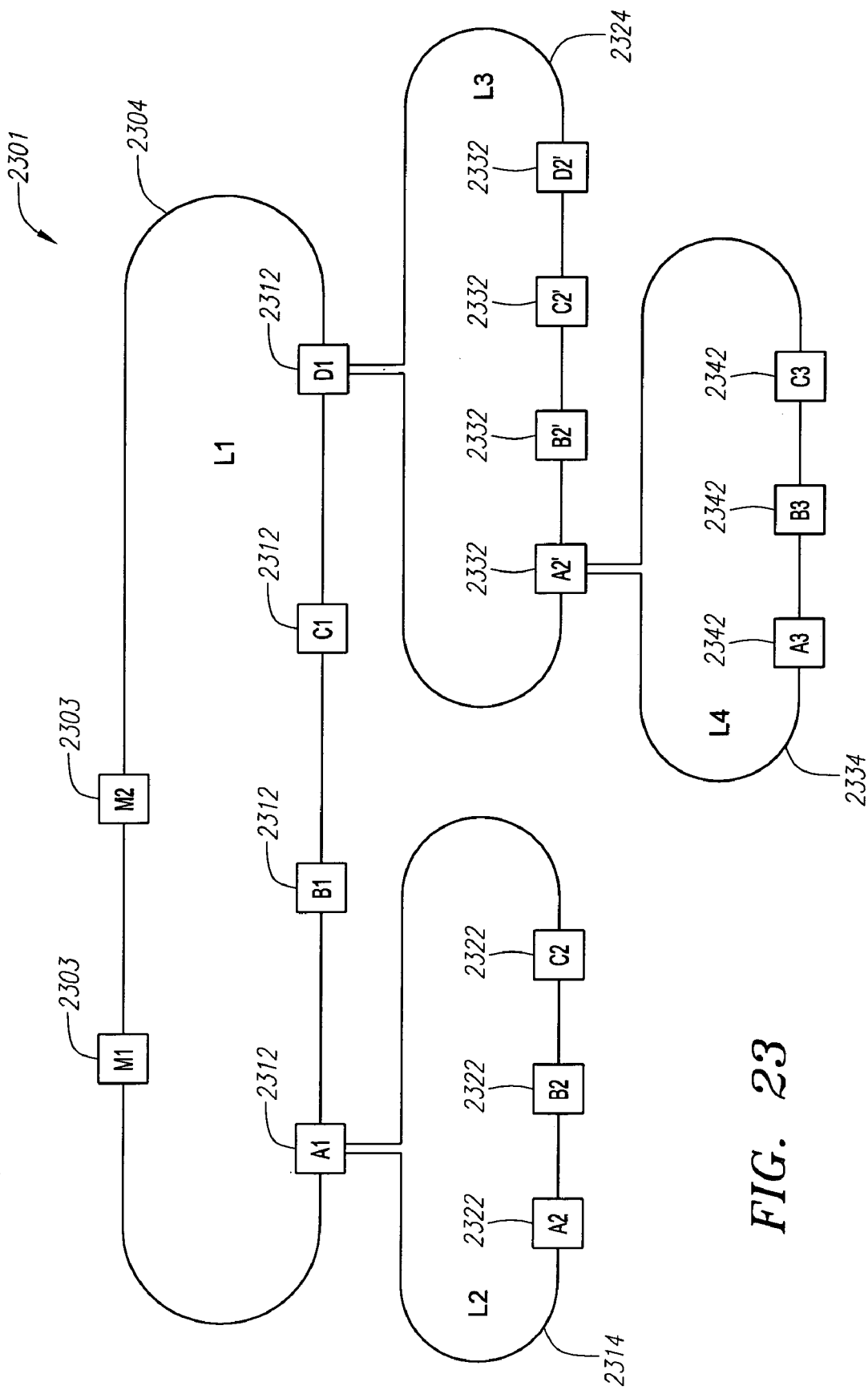
FIG. 23 is a top-level diagram of a multi-tier, hierarchical master-slave fiber optic ring network illustrating more than two network tiers.

FIG. 23 is a top-level diagram of another multi-tier, hierarchical master-slave fiber optic ring network similar in certain respects to the network shown in FIG. 22, but illustrating more than two network tiers. In FIG. 23, a pair of first-tier master nodes M1, M2 share concurrent control of slave nodes 2312 connected to a first-tier fiber optic loop 2304. The first-tier slave node A1 controls slave nodes 2322 connected to a second-tier fiber optic loop 2314, while first-tier slave node D1 controls slave nodes 2332 connected to another second-tier fiber optic loop 2324. The second-tier slave node A2' controls slave nodes 2342 connected to a third-tier fiber optic loop 2334. The same structural architecture can be employed to create a hierarchical network having numerous tiers. Any number of slave nodes at any given tier or in any fiber optic ring may be connected as a master node to a lower tier loop, and thereby may control one or more lower tier loops.

FIG. 22 is a top-level diagram of a multi-tier, hierarchical master-slave fiber optic ring network 2200 similar to FIG. 20 but with multiple fibers in each ring. The fiber optic ring network 2200 shown in FIG. 22 has the same general architecture as the network illustrated in FIG. 20, but uses dual-fiber connections in each ring similar, for example, to the embodiment illustrated in FIG. 7 and described in detail previously herein. Accordingly, each node 2202 or 2204 in the first-tier fiber optic ring 2201, for example, transmits in both directions around the fiber optic ring 2201 (one direction on the A loop and the opposite direction on the B loop), and can receive transmissions on both loops and process or respond thereto. The same type of bidirectional communication preferably occurs in the second-tier fiber optic rings 2221 and 2241. Each of the three fiber optic rings 2201, 2221, and 2241 thus can have a redundant and reliable architecture.

The architecture illustrated in FIG. 22 can also be extrapolated to three or more tiers, such as described previously with respect to FIG. 23.

Figure 19:
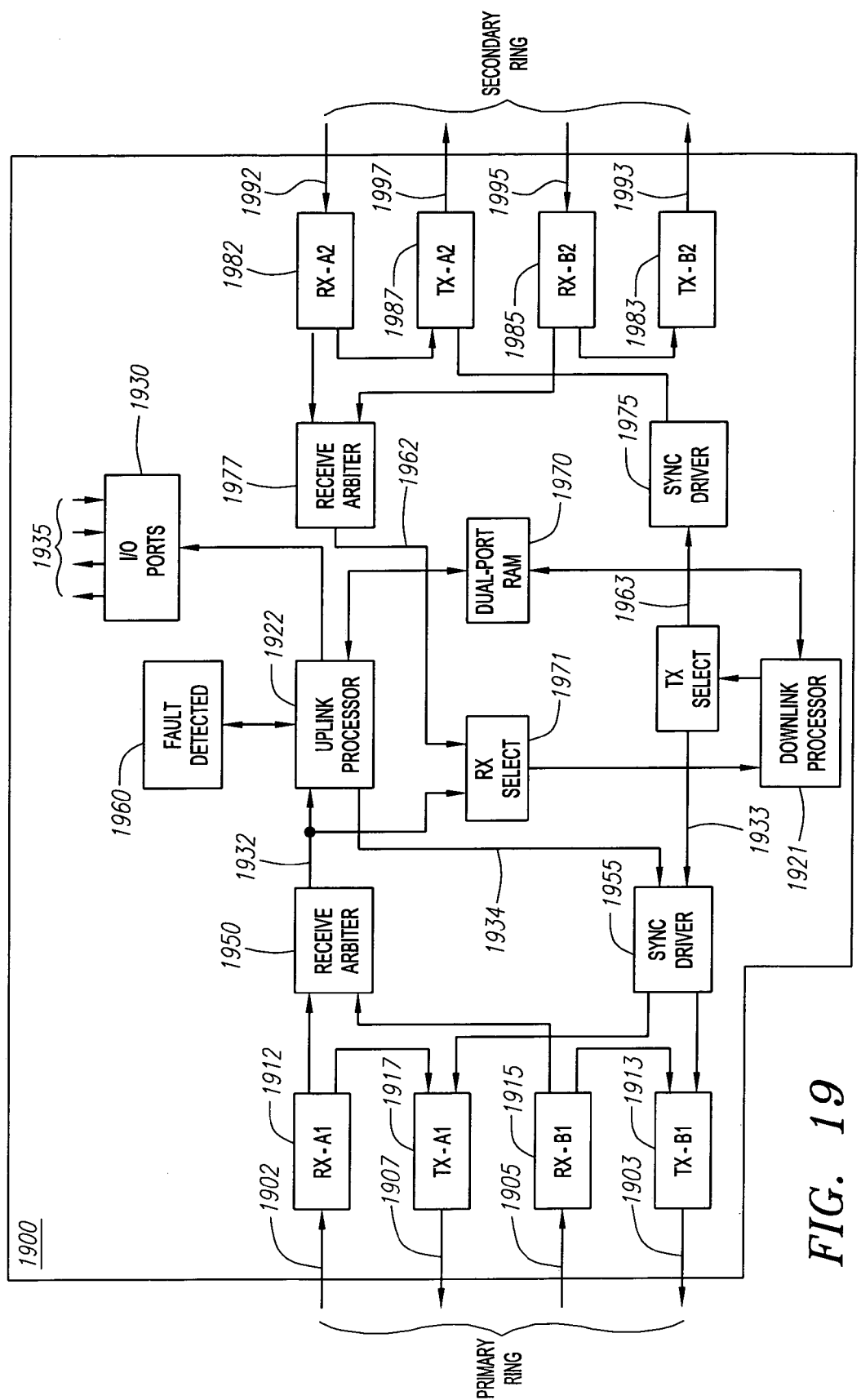
FIG. 19 is a block diagram of a network node having multiple processors and having the capability for simultaneously communicating over two different network rings in different capacities.

FIG. 19 is a block diagram of a network node 1900 as may be used in various ring networks as described herein, such as the ring network 2200 illustrated in FIG. 22. The network node 1900 shown in FIG. 19, among other things, is capable of communicating over a first pair of optical fibers around a first network ring and a second pair of optical fibers around a second network ring. The first network ring may be, e.g., an upper tier network ring in a hierarchical network, and the second network ring may be, e.g., a lower tier network ring in the hierarchical network. The network node 1900 may have uses in other types of network architectures as well.

Multiple master nodes may be used at any level of the ring, and some or all of the rings may include two fiber optics for bidirectional, redundant communication within the network.

In more detail, the network node 1900 preferably includes multiple processors and, more specifically, at least one processor configured to operate in a downlink (or master) capacity and at least one processor configured to operate in an uplink (or slave) capacity. The network node 1900 is illustrated with two processors 1921, 1922, the first processor 1921 configured to operate in a downlink capacity and the second processor 1922 configured to operate in an uplink capacity. The network node 1900 thereby has the capability of simultaneously communicating over two different network rings in different capacities. The uplink processor 1922 receives communications over an A loop and B loop via a receive arbiter 1950, the function and operation of which is similar to the similar component described with respect to FIG. 6. The uplink processor 1922 transmits messages over the A loop and B loop via a synchronizing driver 1955, the function and operation of which is again similar to the similar component described with respect to FIG. 6. The receive arbiter 1950 is connected to a primary ring A loop receiver 1912 and a primary ring B loop receiver 1905, and the synchronizing driver 1955 is connected to a primary ring A loop transmitter 1917 and a primary ring B loop transmitter 1913.

The network node 1900 further includes another receive arbiter 1977 connected to a secondary ring A loop receiver 1992 and to a secondary ring B loop receiver 1995, and another synchronizing driver 1975 connected to a secondary ring A loop transmitter 1997 and to a secondary ring B loop transmitter 1993. The downlink processor 1921 can selectively connect to either the primary (e.g., upper tier) network ring or the secondary (e.g., lower tier) network ring, through receiver select 1971 and transmitter select 1972. If the network node 1900 is configured to operate as master node on the upper tier network ring, then the receive select 1971 and transmitter select 1972 settings are selected such that downlink processor 1921 receives input from the primary ring receive arbiter 1950 and transmits via the primary ring synchronizing driver 1955. On the other hand, if the network node 1900 is configured to operate as master node on the lower tier network ring, then the receive select 1971 and transmitter select 1972 settings are selected such that downlink processor 1921 receives input from the secondary ring receive arbiter 1977 and transmits via the secondary ring synchronizing driver 1975.

As one example, the network node 1900 may serve as an upper tier slave/lower tier master node by having the uplink processor 1922 configured to interact with the primary (e.g., upper tier) network ring and the downlink processor 1921 configured to interact with the secondary (e.g., lower tier) network ring. As another example, the network node 1900 may serve as an upper tier master node by having the downlink processor 1921 configured to interact with the primary (e.g., upper tier) network ring, and optionally may have the uplink processor 1922 configured also to interact with the primary (e.g., upper tier) network ring. As yet another example, the network node 1900 may operate as an upper tier slave node on the primary ring via the uplink processor 1922, but may also serve as a backup master node in case of failure by the upper tier master node. Should the upper tier master node fail, as detected by the fault detector 1960, then the network node 1900 may select the settings of the receive select 1971 and transmit select 1972 so the downlink processor 1921 communicates on the primary ring and can thereby allow the network node 1900 to take over as effective master node. At the same time, if desired, the uplink processor 1922 can continue to operate as it previously had been prior to the master node failure, since communication over the primary ring is preferably multiplexed in such a manner as to avoid collisions, including any potential collisions between the uplink processor 1922 and downlink processor 1921 both accessing the primary ring. The uplink processor 1922 can therefore continue to carry out its previously assigned tasks.

The various ring networks described herein may be designed according to any of a variety of signaling protocols, including the SONET (Synchronous Optical Network) signal hierarchy. The SONET protocol/hierarchy defines a family of digital signals having bit rate which are integer multiples of a basic module signal, referred to as the Synchronous Transport Signal Level 1 (STS-1). The basic module signal is formed from a sequence of repeating frames, each of which includes a set number of bytes (e.g., eight bytes). Some of the bytes are reserved for overhead, while the remaining ones are available for data transport. A detailed explanation of the SONET protocol/hierarchy is not deemed necessary because such details are widely available and well known in the art.

The various network nodes as described herein may be constructed in any suitable manner and may, for example, comprise circuitry and various electronics housed in a rugged, potted case made of a suitable lightweight material such as aluminum that provides environmental protection and allows for heat dissipation. In other types of control environments, different types of housings or constructions may be used.

Many of the embodiments described herein will find particular applicability in on-board vehicle control systems. In this context, the term "vehicle" is used broadly to include any conveyance, including, by way of example, trains, buses, railcars, automobiles, trucks, ships, airplanes, tanks, and military vehicles.

The various embodiments described herein can be implemented using either digital or analog techniques, or any combination thereof. The term "circuit" as used herein is meant broadly to encompass analog components, discrete digital components, microprocessor-based or digital signal processing (DSP), or any combination thereof. The invention is not to be limited by the particular manner in which the operations of the various embodiments are carried out.

While certain system components are described as being "connected" to one another, it should be understood that such language encompasses any type of communication or transference of data, whether or not the components are actually physically connected to one another, or else whether intervening elements are present. It will be understood that additional circuit or system components may be added to the various illustrated or described embodiments without departing from teachings provided herein.

Various embodiments have been described herein in which two fibers are used for communication in the context of, e.g., a ring network system; however it will be appreciated that additional fibers can also be used in the ring network to, e.g., increase bandwidth or provide added redundancy. In addition, throughput may also be increased by transmitting at multiple distinct optical wavelengths (i.e., color or wavelength division multiplexing). A variety of techniques for color or wavelength division multiplexing are known in the art and therefore a detailed explanation thereof is not deemed necessary herein.

While preferred embodiments of the invention have been described herein, many variations are possible which remain within the concept and scope of the invention. Such variations would become clear to one of ordinary skill in the art after inspection of the specification and the drawings. The invention therefore is not to be restricted except within the spirit and scope of any appended claims.

What is claimed is:

1. A hierarchical master-slave control network, comprising:
   a first-tier fiber optic ring;
   a plurality of network nodes, including a plurality of first-tier master nodes and a plurality of first-tier slave nodes, in communication over said first-tier fiber optic ring;
   a second-tier fiber optic ring; and
   at least one second-tier slave node;
   wherein one of said first-tier slave nodes operates as a second-tier master node with respect to said second-tier fiber optic ring and communicates with said at least one second-tier slave node over said second fiber optic ring; and
   wherein said plurality of first-tier master nodes share concurrent control over said first-tier slave nodes, said first-tier master nodes communicating synchronously over said first-tier fiber optic ring in pre-assigned slots of a repeating time frame.

2. The hierarchical master-slave control network of claim 1, further comprising a plurality of third-tier slave nodes connected in a ring configuration, wherein one of said second-tier slave nodes operates as a third-tier master node with respect to said third-tier slave nodes.

3. The hierarchical master-slave control network of claim 2, further comprising a third-tier fiber optic ring connecting said third-tier slave nodes.

4. The hierarchical master-slave control network of claim 1, wherein said first-tier slave node operating as a master node with respect to said second-tier slave nodes comprises an uplink processor for communicating over said first-tier fiber optic ring and a downlink processor for communicating over said second-tier fiber optic ring.

5. The hierarchical master-slave control network of claim 1, further comprising at least one other second-tier master node connected to said second-tier fiber optic ring, said second-tier master node sharing concurrent control over said second-tier slave nodes along with said first-tier slave node operating as a master node with respect to said second-tier slave nodes.

6. The hierarchical master-slave control network of claim 1, wherein said first-tier fiber optic ring comprises a pair of optical fibers providing redundant communication paths for said first-tier master nodes and first-tier slave nodes.

7. The hierarchical master-slave control network of claim 1, wherein said second-tier fiber optic ring composes a pair of optical fibers providing redundant communication paths for said second-tier slave nodes and said first-tier slave node operating as a master node with respect to said second-tier slave nodes.

8. The hierarchical master-slave control network of claim 1, wherein said first-tier master nodes sequentially rotate communication over said first-tier fiber optic ring, within said repeating time frame.

9. A hierarchical master-slave control network, comprising:
   a first-tier fiber optic ring comprising redundant fiber optic communication paths transmitting signals in opposite directions;
   a plurality of network nodes, including at least one first-tier master node and a plurality of first-tier slave nodes, in communication over said first-tier fiber optic ring;
   a second-tier fiber optic ring;
   a plurality of second-tier slave nodes; and
   a second-tier master node;
   wherein one of said first-tier slave nodes operates as a second-tier master node with respect to said second-tier fiber optic ring and shares concurrent control, along with said second-tier master node, over said second-tier slave nodes on said second-tier fiber optic ring.

10. The hierarchical master-slave control network of claim 9, wherein each of said first-tier nodes communicates with other first-tier nodes by transmitting identical data in opposite directions over the redundant fiber optic communication paths of the first-tier fiber optic ring.

11. The hierarchical master-slave control network of claim 10, wherein each intervening first-tier node propagates received data to the next first-tier node until the transmitted data reaches its destination.

12. The hierarchical master-slave control network of claim 9, wherein said first-tier slave node operating as a second-tier master node and said second-tier master node communicate synchronously over said second-tier fiber optic ring in pre-assigned slots of a repeating time frame.

13. The hierarchical master-stave control network of claim 9, wherein at least two first-tier master nodes communicate over said first-tier fiber optic ring and share concurrent control over said first-tier slave nodes.

14. The hierarchical master-slave control network of claim 9, further comprising a plurality of third-tier slave nodes connected in a ring configuration, wherein one of said second-tier slave nodes operates as a third-tier master node with respect to said third-tier slave nodes.

15. The hierarchical master-slave control network of claim 14, further comprising a third-tier fiber optic ring over which said third-tier slave nodes communicate with said second-tier slave node operating as a third-tier master node.

16. A hierarchical master-slave control network, comprising:
   at least one first-tier master node;
   a plurality of first-tier slave nodes connected in a loop configuration along with said at least one first-tier master node, thereby forming a first network ring;
   a second-tier master node; and
   a plurality of second-tier slave nodes;
   wherein said plurality of second-tier slave nodes and said second-tier master node are connected in a loop configuration, along with one of said first-tier slave nodes configured to operate as a master node with respect to said second-tier slave nodes, thereby forming a second network ring;
   wherein said second-tier master node and said first-tier slave node configured to operate as a master node with respect to said second-tier slave nodes share concurrent control over said second-tier slave nodes; and
   wherein at least one of said first network ring and said second network ring comprises a fiber optic ring.

17. The hierarchical master-slave control network of claim 16, wherein said first-tier slave node configured to operate as a master node with respect to said second-tier slave nodes comprises an uplink processor for communicating over said first network ring and a downlink processor for communicating over said second network ring.

18. The hierarchical master-slave control network of claim 16, further comprising a plurality of third-tier slave nodes connected in a loop configuration, thereby forming a third network ring, wherein one of said second-tier slave nodes operates as a master node with respect to said third-tier slave nodes.

19. The hierarchical master-slave control network of claim 18, wherein said second-tier slave node operating as a third-tier master node with respect to said third-tier slave nodes comprises an uplink processor for communicating over said second network ring and a downlink processor for communicating over said third network ring.

20. The hierarchical master-slave control network of claim 16, wherein each of said first network ring and said second network ring comprises a fiber optic ring.

21. The hierarchical master-slave control network of claim 16, further comprising at least one other second-tier master node connected to said second network ring, said second-tier master node sharing concurrent control over said second-tier slave nodes along with said first-tier slave node operating as a master node with respect to said second-tier slave nodes.

22. The hierarchical master-slave control network of claim 16, wherein said fiber optic ring comprises a pair of optical fibers providing redundant communication paths for the network nodes connected thereto.

23. A hierarchical master-slave control network, comprising:
- a first-tier fiber optic ring;
- a plurality of network nodes, including a plurality of first-tier master nodes and a plurality of first-tier slave nodes, in communication over said first-tier fiber optic ring;
- a second-tier fiber optic ring; and
- at least one second-tier slave node;
- wherein one of said first-tier slave nodes operates as a second-tier master node with respect to said second-tier fiber optic ring and communicates with said at least one second-tier slave node over said second fiber optic ring;
- wherein said plurality of first-tier master nodes share concurrent control over said first-tier slave nodes;
- wherein each of said first-tier master nodes controls a distinct, non-overlapping subset of said first-tier slave nodes; and
- wherein said network nodes each comprise a processor and supporting electronics contained in an enclosed housing.

* * * * *